(12) United States Patent
Karthik et al.

(10) Patent No.: US 12,487,892 B2
(45) Date of Patent: Dec. 2, 2025

(54) BACKUP DATA CONSOLIDATION

(71) Applicant: Rubrik, Inc., Palo Alto, CA (US)

(72) Inventors: Vijay Karthik, Sunnyvale, CA (US); Abdullah Reza, Gilroy, CA (US)

(73) Assignee: Rubrik, Inc., Palo Alto, CA (US)

( * ) Notice: Subject to any disclaimer, the term of this patent is extended or adjusted under 35 U.S.C. 154(b) by 4 days.

(21) Appl. No.: 17/732,118

(22) Filed: Apr. 28, 2022

(65) Prior Publication Data

US 2023/0350764 A1    Nov. 2, 2023

(51) Int. Cl.
*G06F 11/14* (2006.01)

(52) U.S. Cl.
CPC ...... *G06F 11/1464* (2013.01); *G06F 2201/84* (2013.01)

(58) Field of Classification Search
CPC .......... G06F 11/1464; G06F 2201/84
See application file for complete search history.

(56) References Cited

U.S. PATENT DOCUMENTS

| | | | |
|---|---|---|---|
| 9,733,862 B1 | 8/2017 | Klemm et al. | |
| 10,853,314 B1* | 12/2020 | Shemer | G06F 16/122 |
| 11,886,226 B2 | 1/2024 | Karthik et al. | |
| 2011/0119459 A1 | 5/2011 | Satoyama et al. | |
| 2012/0221527 A1 | 8/2012 | Huang | |
| 2012/0254848 A1* | 10/2012 | Robertson | G06F 9/44521 717/166 |
| 2014/0149698 A1 | 5/2014 | Ezra et al. | |
| 2014/0196124 A1* | 7/2014 | Wang | G06F 21/78 709/217 |
| 2015/0112935 A1* | 4/2015 | French | G06F 16/11 707/822 |
| 2015/0234712 A1 | 8/2015 | Fei et al. | |
| 2017/0220427 A1* | 8/2017 | Fu | G06F 11/1469 |
| 2018/0004656 A1 | 1/2018 | Battaje et al. | |
| 2018/0041483 A1 | 2/2018 | Smith et al. | |
| 2019/0213123 A1* | 7/2019 | Agarwal | G06F 3/0608 |
| 2020/0019532 A1* | 1/2020 | Kashi Visvanathan | G06F 16/2365 |
| 2020/0174692 A1 | 6/2020 | Dave et al. | |
| 2021/0173749 A1 | 6/2021 | Ki et al. | |
| 2022/0066882 A1* | 3/2022 | Wang | G06F 12/0253 |
| 2023/0080500 A1 | 3/2023 | Karthik et al. | |
| 2023/0168968 A1 | 6/2023 | Karthik et al. | |
| 2023/0251934 A1 | 8/2023 | Karthik et al. | |

FOREIGN PATENT DOCUMENTS

CN     104573089 A     4/2015

* cited by examiner

*Primary Examiner* — Allen S Lin
(74) *Attorney, Agent, or Firm* — Holland & Hart LLP

(57) ABSTRACT

A storage system may store one or more snapshots of a computing system to support backup and restoration of data stored at the computing system. The storage system may identify an expiration of a first snapshot indicating a first set of physical storage locations to which first data of the computing system was stored as part of a first backup procedure. The storage system may identify a first subset physical storage locations of the first set as storing a first portion of the first data that is superseded by second data associated with a second snapshot. Based on identifying the first subset, the storage system may delete the first portion of the first data from the first subset of physical storage locations and retain a second portion of the first data at a second subset of physical storage locations.

20 Claims, 12 Drawing Sheets

BACKUP DATA CONSOLIDATION

FIELD OF TECHNOLOGY

The present disclosure relates generally to database systems and data processing, and more specifically to techniques for backup data consolidation.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, or ease-of-use, among other possible performance metrics.

DETAILED DESCRIPTION

Figure 1:
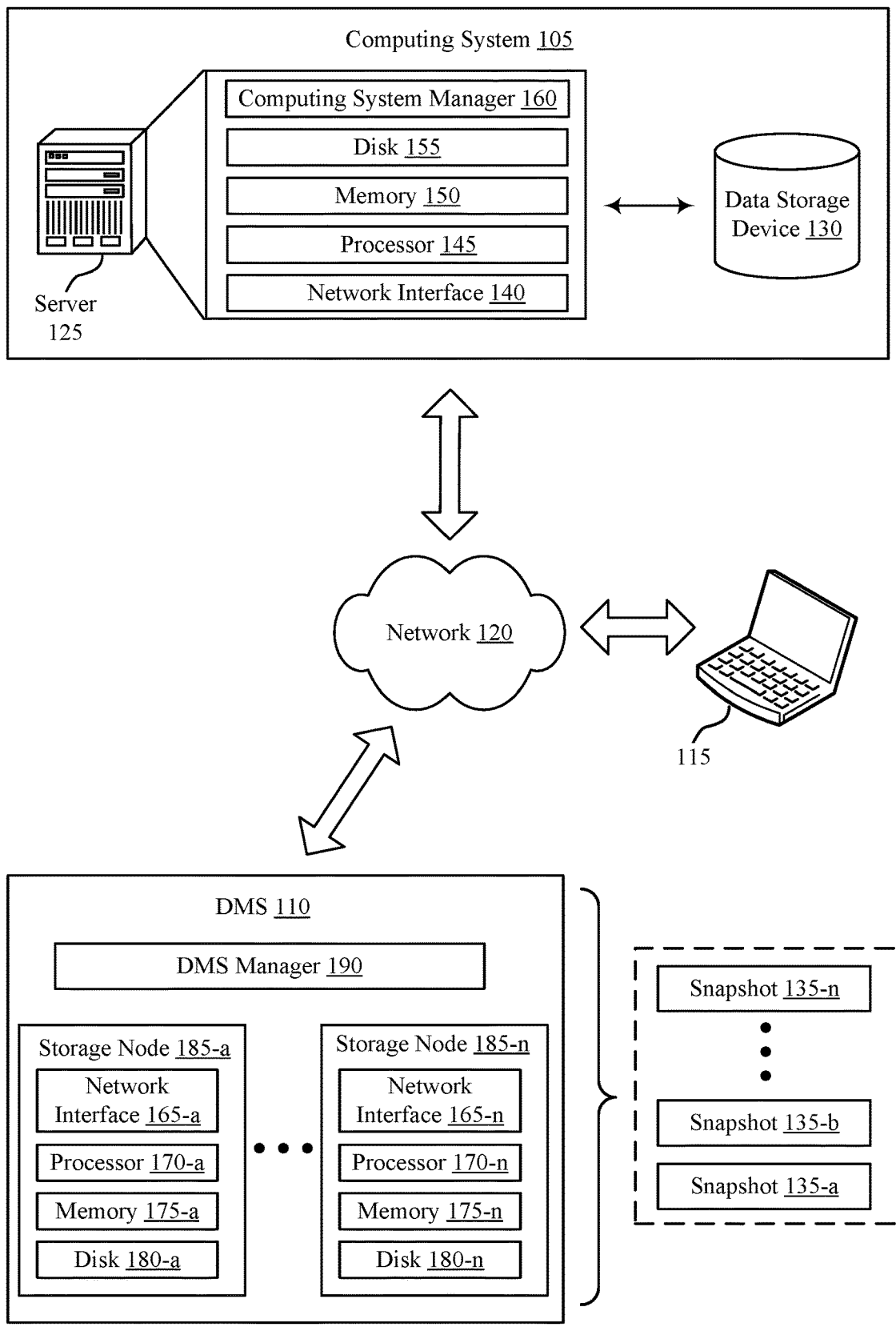
FIG. 1 illustrates an example of a computing environment that supports techniques for backup data consolidation in accordance with aspects of the present disclosure.

Some storage systems (e.g., cloud data storage services) may support the backing up of a database stored at a computing system such that restoration (e.g., recovery) of the database is possible. In some examples, a storage system (e.g., a storage appliance, a server, a server cluster) may store one or more snapshots (e.g., point in time snapshots) of the database to support the backing up and restoration of the database. The storage system may be configured to store snapshots for a given period of time, for example, according to a user configuration (e.g., for 10 days, 1 month, 1 year, and the like). When a snapshot expires (e.g., when a snapshot has been stored for the given period of time), the storage system may merge the expired snapshot with a non-expired snapshot to create a new merged snapshot, while deleting the expired snapshot. Such merging may enable incrementally updated data in the expired snapshot that would not otherwise be captured in the non-expired snapshot to be retained, while still deleting the expired snapshot in accordance with the user configuration (e.g., to free up space at the storage system).

To merge two snapshots, the data associated with both snapshots may be read from corresponding physical storage locations, which may be referred to as stripes. The combined data may then be written to a new set of stripes associated with the new "merged" snapshot, with duplicative content written once such that overall space savings are achieved. However, the storage system may support a limited quantity of read/write operations per second, and the reading and writing associated with merging snapshot content into a new snapshot may reduce the quantity of read/write operations that are available for other operations, thus potentially increasing latency and delay of performing the other operations. Additionally or alternatively, in some examples, the storage system may write data to the new snapshot before deleting the expired snapshot, for example, in order to read data from the expired snapshot to write to the new snapshot. In some cases, however, the storage system may have insufficient available storage space for the new snapshot without first deleting the expired snapshot, thereby resulting in the merging of snapshots being unsupported.

Techniques, systems, and devices are described herein to enable the freeing of storage space associated with expired snapshots without re-writing data to new stripes, thereby improving performance of a storage system. For example, when a snapshot expires (e.g., or upon identification of an upcoming expiration of the snapshot), the storage system may identify which stripes associated with the snapshot are "unreachable." A stripe is considered unreachable if the data stored to that stripe has been superseded (e.g., rendered outdated or obsolete) by a subsequent snapshot storing updated data associated with the same logical address range. When data stored to a stripe (e.g., when an entirety of the data stored to the stripe) is superseded by subsequently updated and stored data, no logical address will map to any physical address within the stripe, and hence the stripe is not reachable based on any logical-to-physical mapping. Instead of merging the expired snapshot with a non-expired snapshot to create a new merged snapshot, the storage system may delete the unreachable stripes and retain the other contents of the expired snapshot (e.g., retain data stored in reachable stripes associated with the snapshot). Such deletion and retention may provide storage space savings associated with deleting the superseded (e.g., outdated, overwritten) content while avoiding additional reads and rewriting of content from the expired snapshot that would otherwise be propagated to the new merged snapshot, among other potential benefits.

The storage system may also support the merging of snapshots but may wait until other criteria are satisfied before merging snapshots, such as waiting until a greater quantity of snapshots (e.g., a threshold quantity) have expired before merging, until a quantity of leaked space (e.g., leaked data) satisfies a threshold, or any combination thereof, among other criteria described herein. For example, rather than performing a merger upon each snapshot expiration, the storage system may wait until a threshold quantity of snapshots have expired and then merge the expired snapshots with a non-expired snapshot (e.g., while deleting the unreachable stripes of the expired snapshots between respective snapshot expiration and merger), thereby freeing storage space with each snapshot's expiration while reducing the frequency of resource-intensive mergers. As a result, latency associated with performing other operations (e.g., backup operations, restoration operations, other read and write operations, among others) at the storage system may also be reduced.

Aspects of the disclosure are initially described in the context of an environment supporting on-demand backup and retrieval services. Aspects of the disclosure are further described with respect to a server, storage appliance, a data storage diagram, consolidation diagrams, and a process flow. Aspects of the disclosure are further illustrated by and described with reference to apparatus diagrams, system diagrams, and flowcharts that relate to techniques for backup data consolidation.

FIG. 1 illustrates an example of a computing environment 100 that supports techniques for backup data consolidation in accordance with examples disclosed herein. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SSDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g. a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state-which may be referred to as the delta-of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely impacting other aspects of the performance of the computing system 105.

As described herein, the DMS 110 (e.g., the DMS manager 190, one or more storage nodes 185) may support the freeing of storage space (e.g., within one or more memories 175, one or more disks 180, or any combination thereof) associated with expired snapshots 135 without re-writing data to new physical storage locations (e.g., stripes). For example, the DMS 110 may be configured to store snapshots 135 for a period of time (e.g., in accordance with a user or customer configuration) after which the snapshots 135 may be considered expired. In some cases, in response to an expiration of a snapshot 135, the DMS 110 may be configured to merge the expired snapshot 135 with a non-expired snapshot 135 to create a new snapshot 135 and then delete the expired snapshot 135. In some cases, however, the merging of snapshots 135 may use some of a limited quantity of read/write operations per second that are supported by the DMS 110 (e.g., by one or more storage nodes 185), thereby reducing the quantity of read/write operations that are available for other operations and potentially increasing latency and delay of performing the other operations.

In accordance with examples described herein, the DMS 110 may be configured to delete data from one or more stripes associated with an expired snapshot 135, for example, without merging the expired snapshot 135 with a non-expired snapshot 135. For example, the DMS 110 may identify an expiration of a snapshot 135 (e.g., that the snapshot 135 has expired, that the snapshot 135 is set to expire at a particular time). The DMS 110 may identify which stripes of the snapshot 135 are unreachable and, after the snapshot is expired, may delete data stored in the unreachable stripes, thereby freeing the stripes for storage of other data. The DMS 110 may also retain data stored in any reachable stripes associated with the snapshot 135 that may exist. That is, instead of merging the expired snapshot 135 with a non-expired snapshot 135, the DMS 110 may delete data stored in the unreachable stripes, thereby providing storage space savings associated with deleting outdated content (e.g., superseded data) while avoiding additional reads and rewriting of content from the expired snapshot 135 that would otherwise be propagated to a new merged snapshot 135.

The DMS 110 may also support the merging of snapshots but may wait until one or more other criteria are satisfied before merging snapshots 135 while deleting the unreachable stripes of the expired snapshots 135 between respective snapshot expiration and merger, thereby freeing storage space with each snapshot 135's expiration while reducing the frequency of resource-intensive mergers. As a result, latency associated with performing other operations (e.g., backup operations, restoration operations, other read and write operations, among others) at the DMS 110 may also be reduced.

It is to be understood that one or more aspects of the disclosure may be implemented in a computing environment 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
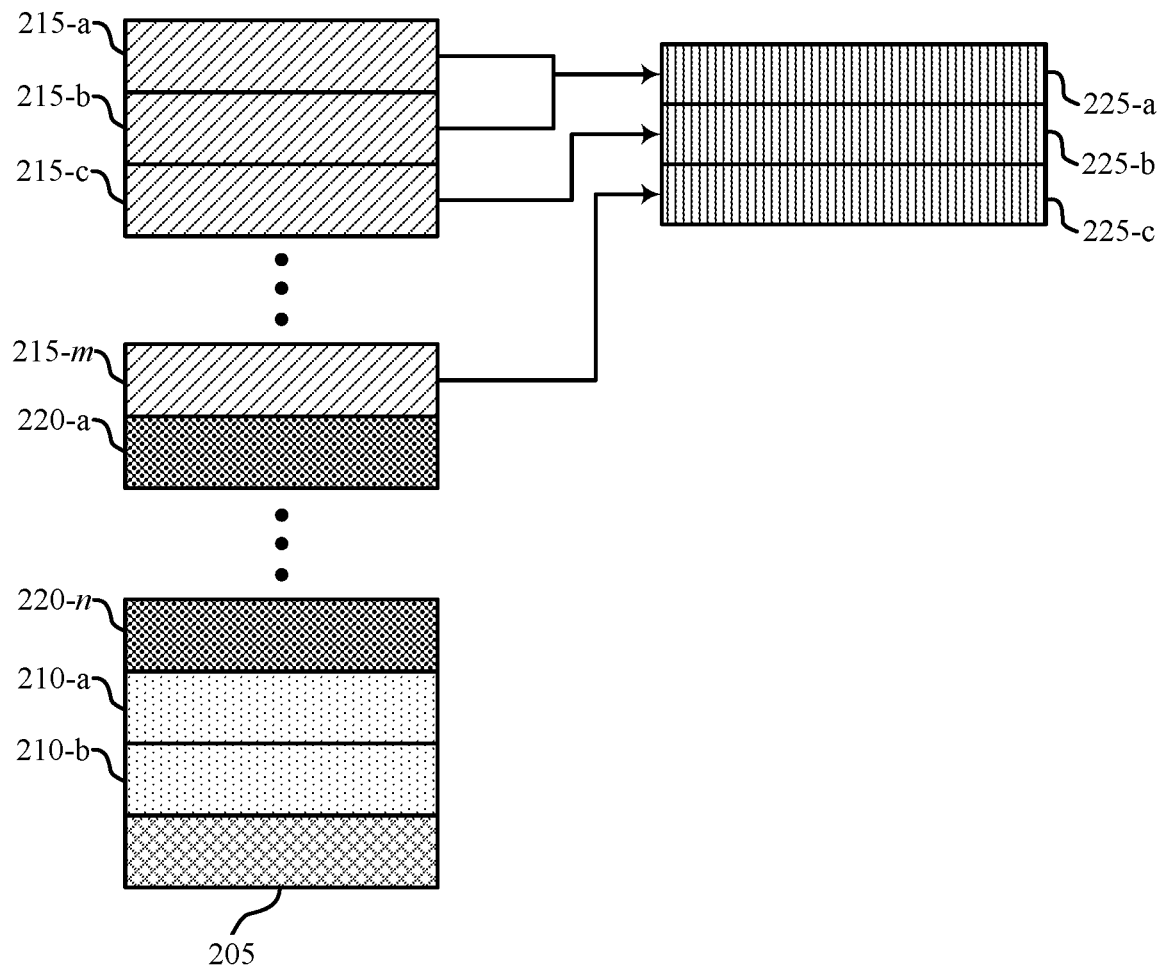
FIG. 2 illustrates an example of a data storage diagram that supports techniques for backup data consolidation in accordance with aspects of the present disclosure.
Figure 2:
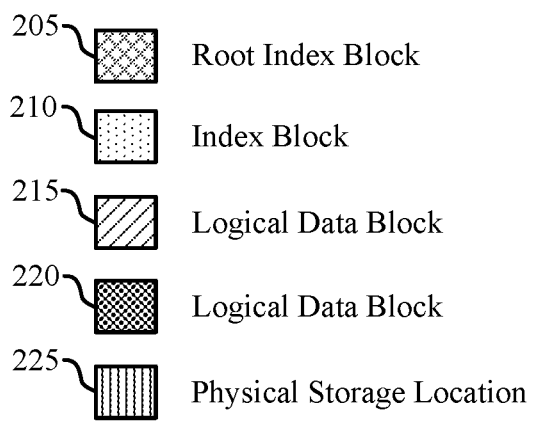

FIG. 2 illustrates an example of a data storage diagram 200 that supports techniques for backup data consolidation in accordance with aspects of the present disclosure. The data storage diagram 200 may be implemented by aspects of the computing environment 100 described with reference to FIG. 1. For example, the data storage diagram 200 may be implemented by a storage system, such as a DMS 110 as described with reference to FIG. 1, or another storage system that supports the storage and management of snapshots. Implementation of the data storage diagram 200 may support the consolidation of data without the merging of expired and non-expired snapshots, which may support increased storage availability, improved storage efficiency, reduced latency and delay, and improved read/write operation resource efficiency, among other benefits.

The data storage diagram 200 may be an example of a patch file format that may be implemented by the storage system to store backup data of a computing system (e.g., a computing system 105), such as snapshots of the computing system (e.g., a snapshot 135). In some examples, the patch file format may be a two-level index key value store, where the keys are offsets and the values are data blocks (e.g., logical data blocks 215, logical data blocks 220). For example, a patch file for storing a snapshot may include a root index block 205 and one or more index blocks 210, which may be located at the end of the patch file or interleaved through the patch file (e.g., an index block 210 located after a respective set of logical data blocks). An index block 210 may contain index information, such as metadata, corresponding to a set of logical data blocks of the patch file. For example, an index block 210-*a* may include metadata associated with logical data blocks 215 included in the patch file, and an index block 210-*b* may include metadata associated with logical data blocks 220 included in the patch file. The root index block 205 may include information (e.g., metadata) about the index blocks 210. For example, the root index block 205 may indicate which index blocks 210 should be read to access a given logical data block.

Metadata included in the index blocks 210 may include logical-to-physical mapping information for accessing (e.g., reading) data corresponding to a given logical data block. For example, the logical data blocks 215 and the logical data blocks 220 may each be associated with one or more logical offsets (e.g., a range of logical offsets) within a logical address range. For instance, in the example of FIG. 2, the patch file may include a logical data block 215-*a* through a logical data block 215-*m* and a logical data block 220-*a* through a logical data block 220-*n*. As one example, the logical data block 215-*a* may be associated with a logical offset 0, a logical data block 215-*b* may be associated with a logical offset 1, a logical data block 215-*c* may be associated a logical offset 2, and so on up to the logical data block 215-*m* being associated with a logical offset m−1. Similarly, the logical data block 220-*a* may be associated with a logical offset m and so on up through the logical data block 220-*n* being associated with a logical offset n−1. As another example, the logical data blocks may each be associated with a range of logical offsets. For example, the logical data block 215-*a* may be associated with logical offsets 0-32, the logical data block 215-*b* may be associated with logical offsets 33-64, the logical data block 215-*c* may be associated logical offsets 65-96, and so on (although other ranges of logical offsets may be supported, such as each logical data block being associated with a range of 65536 logical offsets, among other values). The logical data blocks 220 may similarly be associated with respective ranges of logical offsets.

The patch file may include any quantity of logical data blocks 215 and logical data blocks 220 (e.g., 10, 20, 100, 1000, 8192 logical data blocks 215 and logical data blocks 220, among other possible quantities) with each logical data block corresponding to a quantity of logical data (e.g., 64 kilobytes (KB) of logical data, 128 KB of logical data, among other possible quantities).

The metadata included in the index blocks 210 may indicate physical addresses (e.g., physical offsets) at which data corresponding to a logical data block is physically stored. For example, the metadata may indicate that data corresponding to a given logical data block 215-*a* is stored at a physical address (e.g., a range of physical addresses) within a given physical storage location 225 of the storage system (e.g., of a memory 175, of a disk 180). A physical storage location 225, which may be referred to as a stripe, may be a physical data block having a configured size (e.g.,) that spans a range of physical addresses of the storage system based on the configured size. In some examples, each physical storage location 225 may include multiple chunks of data. In the example of FIG. 2, the metadata may indicate that data corresponding to the logical data blocks 215-*a* and 215-*b* are stored at a physical storage location 225-*a* (e.g., physical addresses within the physical storage location 225-*a*), data corresponding to the logical data block 215-*c* is stored at a physical storage location 225-*b*, and data corresponding to the logical data block 215-*m* is stored at a physical storage location 225-*c*. The metadata may also indicate a name of a file (e.g. a computing object) to which the data corresponds (e.g., the name of the file that the snapshot is used to backup) and a physical size (e.g., quantity of bytes) of the data corresponding to the logical data block. For example, data corresponding to a logic data block may be compressed such that a physical size of the data may be less than a logical size of the data, and the physical size may be used to determine a physical address range spanned by the data in a physical storage location 225.

Thus, a patch file may be used to access (e.g., read, write) data corresponding to logical data blocks to physical storage locations 225. For example, to read data corresponding to a given logical address range (e.g., logical offsets 0 to 20), the storage system may access the root index block 205, which may indicate the index block 210 that includes metadata corresponding to the logical address range. The storage system may access the index block 210 to determine the physical storage locations 225 (e.g., physical addresses within the physical storage locations 225) that store the data corresponding to the logical address range and may read the data from the physical storage locations 225 based on the metadata included in the index block 210.

In some examples, a patch file may be an example of a sparse file. For example, for a given incremental snapshot, a corresponding sparse file in which the incremental snapshot is stored may include logical data blocks corresponding to data that has changed since a previous snapshot. That is, the logical address ranges associated with the logical data blocks of an individual sparse file may not span the entire logical address space for a file that includes the data, and there may be gaps between the different logical address ranges associated with the logical data blocks of the sparse file. As such, data within a single file (e.g., of a filesystem, virtual machine, database) may be stored across multiple sparse files and in discontinuous physical locations within the storage system.

In some examples, if the patch file illustrated in FIG. 2 is a sparse file (e.g., corresponding to an incremental snapshot), the index blocks 210 may include metadata for logical data blocks within a logical address range associated with the sparse file and exclude metadata for logical data blocks outside of the logical address range. For example, if the sparse file is associated with a logical address range of logical offsets 20-40 and 100-200 of a logical address space spanning logical offsets 0-1000, the index blocks 210 may include metadata for logical data blocks associated with logical offsets 20-40 and 100-200 and may exclude metadata for logical data blocks associated with logical offsets 0-19, 41-99, and 201-1000. Alternatively, if the patch file corresponds to a base snapshot and is thus associated with the full logical address space, the index blocks 210 may include metadata for logical data blocks associated with logical offsets 0-100. Thus, by accessing the index blocks 210, the storage system may determine the logical address range of a file for which data (e.g., updated data) was stored as part of a backup procedure during which a snapshot was captured.

The storage system may also determine the physical storage locations 225 to which the data was stored when the snapshot was captured. For example, using physical addresses (e.g., physical offsets, physical sizes, or a combination thereof) indicated in the metadata included in the index blocks 210, the storage system may map the physical addresses to the physical storage locations 225 corresponding to the logical address range associated with the snapshot. For instance, because the physical storage locations 225 have a configured (e.g., fixed) size and thus include a configured quantity of physical addresses, there may be a one-to-one mapping between a physical offset and an identifier associated with a physical storage location 225, thereby enabling the storage system to determine the physical storage locations 225 to which the data was stored based on the metadata included in the index blocks 210. Accordingly, a snapshot (e.g., stored as a patch file or sparse file) may indicate a set of physical storage locations 225 to which data was stored as part of a backup procedure.

The storage system may be configured to store snapshots for a given period of time, such as in accordance with a user configuration, after which the snapshots may be considered expired. Based on the expiration of a snapshot, the storage system may identify which physical storage locations 225 store superseded data. For example, between capturing the snapshot and the expiration of the snapshot, portions of the data associated with the snapshot may be updated and stored as part of subsequent backup procedure(s) during which subsequent snapshots are created. Thus, the portions of the data that were updated may be rendered superseded by the updated data. The storage system may identify those physical storage locations 225 for which an entirety of the physical storage location 225 is used to store superseded data and may delete the identified physical storage locations 225. For example, if an entirety of the physical storage location 225-a is used to store the logical data blocks 215-a and 215-b and the data corresponding to the logical data blocks 215-a and 215-b was subsequently updated, the storage system may delete the physical storage location 225-a after expiration of the snapshot. The storage system may also identify those physical storage locations 225 for which at least a portion of the physical storage location 225 is used to store non-superseded data and may retain such physical storage locations 225 after expiration of the snapshot. For example, if at least a portion of the physical storage locations 225-b and 225-c store non-superseded data, the storage system may retain (e.g., refrain from deleting) the data stored at the physical storage locations 225-b and 225-c.

In some examples, the storage system may delete and retain physical storage locations 225 after expiration of a snapshot to consolidate data (e.g., free storage space of the storage system) rather than merging the snapshot with a non-expired snapshot to consolidate the data. That is, rather than merging a patch file of an expired snapshot with a patch file of a non-expired snapshot, the storage system may delete and retain physical storage locations 225 indicated by the expired snapshot based on whether the physical storage locations 225 (e.g., an entirety of the physical storage locations 225) store superseded data.

Figure 3:
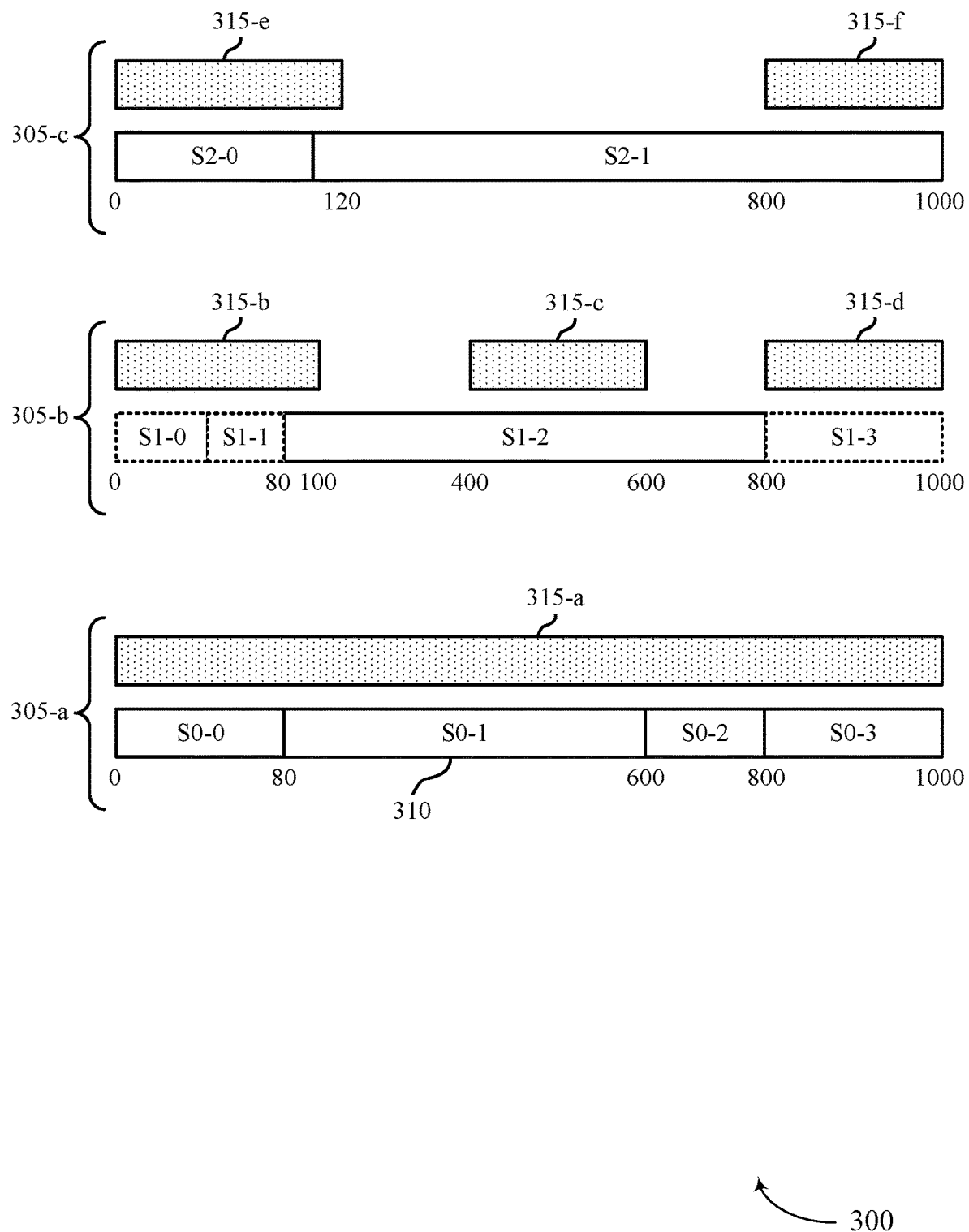
FIGS. 3 and 4 illustrate examples of consolidation diagrams that supports techniques for backup data consolidation in accordance with aspects of the present disclosure.

FIG. 3 illustrates an example of a consolidation diagram 300 that supports techniques for backup data consolidation in accordance with aspects of the present disclosure. The consolidation diagram 300 may be implemented by aspects of the computing environment 100 described with reference to FIGS. 1 through 2. For example, the consolidation diagram 300 may be implemented by a storage system as described herein, including with reference to FIGS. 1 through 2.

The consolidation diagram 300 depicts a set of snapshots 305 stored at the storage system. For example, storage system may store a snapshot 305-a, a snapshot 305-b, and a snapshot 305-c. The snapshot 305-a may be an example of a base snapshot of a file of a computing system (e.g., a computing object). For example, the snapshot 305-a may correspond to an entirety of a logical address range associated with the file. For example, if the file is associated with a logical address range of logical offsets 0-1000, the snapshot 305-a may correspond to a point-in-time snapshot of the entirety of the file and thus include logical data 315-a corresponding to the entire logical address range. The snapshot 305-b and the snapshot 305-c may be examples of incremental snapshots of the file including logical data 315 corresponding to data that has been updated since earlier point in time snapshots (e.g., the snapshot 305-a, and the snapshots 305-a and 305-b, respectively). It is noted that the aspects of FIG. 3 are described with reference to a file having a logical address range of 0-1000, however, any logical address range spanning any quantity of logical offsets may be supported.

The consolidation diagram 300 depicts stripes 310 at which data associated with each snapshot 305 is stored, where the stripes 310 may be examples of a physical storage location 225 described with reference to FIG. 2. For example, the snapshot 305-a may indicate that the logical data 315-a is stored at respective stripes SO, the snapshot 305-b may indicate that logical data 315-b, 315-c, and 315-d is stored at respective stripes S1, and the snapshot 305-b may indicate that logical data 315-e and 315 is stored at respective stripes S2. Each logical data 315 may be associated with a logical address range of the file. For example, the logical data 315-a may correspond to the entire logical address range from logical offset 0 to logical offset 1000. The logical data 315-b, 315-c, and 315-d may include updated data since the snapshot 305-a corresponding to logical offsets 0-100, 400-600, and 800-1000, respectively. The logical data 315-e and 315-f may include updated data since the snapshots 305-a and 305-b correspond to logical offsets 0-120 and 800-1000.

The snapshots 305 may also indicate a logical address range spanned by each stripe 310. For example, for snapshot 305-a, data corresponding to logical offsets 0-80 may be stored at stripe SO-0, data corresponding to logical offsets 81-600 may be stored at stripe S0-1, data corresponding to logical offsets 601-800 may be stored at stripe SO-2, and data corresponding to logical offsets 801-1000 may be stored at stripe SO-3. For snapshot 305-b, the updated data of logical data 315-b may be stored at stripe S1-0, S1-1, and a portion of S1-2. That is, an entirety of the stripes S1-0 and S1-1 may be used to store the logical data 315-b and a portion of the stripe S1-2 may be used to store a remainder of the logical data 315-b (e.g., data corresponding to logical offsets 81-100). Additionally, the updated data of logical data 315-c may be stored at stripe S1-2 and the updated data of logical data 315-d may be stored at stripe S1-3. The snapshot 305-b may not include logical data corresponding to logical offsets 101-399 and 601-799. Because the stripe S1-2 is used to store a portion of the logical data 315-b, the stripe S1-2 may be considered to span the logical address range of logical offsets 81-799, although no data corresponding to logical offsets 101-399 and 601-799 is stored in stripe S1-2. For snapshot 305-c, the updated data of logical data 315-e may be stored at stripe S2-0 and a portion of stripe S2-1, and the updated data of logical data 315-f may be stored at stripe S2-1. The stripe D2-1 may similarly be considered to span the logical offsets 121-799 despite no data corresponding to the logical offsets 121-799 being stored at stripe S2-1.

Logical data 315 of a given snapshot 305 may be superseded by logical data 315 associated with subsequent snapshots 305. For example, the logical data 315-a corresponding to logical offsets 0-100, 400-600, and 800-1000 may be superseded by the logical data 315-b, 315-c, and 315-d, respectively. Additionally, all of the logical data 315-b and the logical data 315-a corresponding to logical offsets 101-120 may be superseded by the logical data 315-e and all of the logical data 315-d may be superseded by the logical data 315-f. As such, in the example of FIG. 3, the non-superseded data corresponding to the logical address range 0-1000 may correspond to the logical data 315-e, the logical data 315-a corresponding to logical offsets 121-400, the logical data 315-c, the logical data 315-a corresponding to logical offsets 601-799, and the logical data 315-f. Logical data 315 being superseded or non-superseded may be used by the storage system in data consolidation when snapshots 305 expire.

For example, the storage system may identify an expiration of the snapshot 305-b. Based on the expiration of the snapshot, the storage system may identify the stripes S1 indicated by the snapshot 305-b that store superseded data. For example, the storage system may identify that an entirety of the stripes S1-0, S1-1, and S1-3 store data that is superseded by data associated with the snapshot 305-c. The storage system may also identify that the stripe S1-2 stores superseded data corresponding to logical offsets 81-100 and non-superseded data corresponding to logical offsets 400-600. That is, a first portion of the stripe S1-2 stores superseded data and a second portion of the stripe S1-2 stores non-superseded data. After identifying the stripes S1, the storage system may delete the stripes S1 for which an entirety of the stripe S1 is used to store superseded data while retaining stripes S1 for which at least a portion of the stripe S1 is used to store non-superseded data. For example, the storage system may delete data stored at the stripes S1-0, S1-1, and S1-3 based on an entirety of the stripes S1-0, S1-1, and S1-3 being used to store superseded data. The storage system may retain data stored at the stripe S1-2 (e.g., including the superseded data corresponding to logical offsets 81-100) based on the stripe S1-2 storing the non-superseded data corresponding to logical data 315-c (e.g., despite being used to store some superseded data).

By deleting and retaining different stripes 310 in this way, the storage system may provide storage space savings associated with deleting the superseded data while avoiding additional reads and rewriting of data from the expired snapshot that would otherwise be propagated to a merged snapshot, among other benefits. For example, rather than merging the snapshot 305-b and the snapshot 305-c after the snapshot 305-b expires, the storage system may delete the stripes S1-0, S1-1, and S1-3 to make the storage space of the stripes S1-0, S1-1, and S1-3 available. Additionally, the logical data 315-c that would be propagated to a merged snapshot would still be available for reading based on retaining the stripes S1-2.

To support the deletion and retention of different stripes 310 of expired snapshots, the storage system may perform a dry read of the snapshots 305 to determine which stripes 310 are unreachable and which stripes 310 are reachable. That is, the storage system may perform the dry read to identify that the entirety of the stripes S1-0, S1-1, and S1-3 are used to store superseded data and that at least a portion of the stripe S1-2 is used to store non-superseded data. To perform the dry read, the storage system may read metadata stored in index blocks (e.g., index blocks 210) associated with the snapshots 305-a, 305-b, and 305-c. That is, in performing the dry read, data stored at the stripes 310 may not be read. Instead, the corresponding metadata stored in the index blocks is read, which may reduce load on the storage system, increase performance, reduce latency, or any combination thereof, for example, compared to merging operations that include the reading of data from the stripes 310 for rewriting to new stripes 310. Based on the metadata, the storage system may identify the stripes 310 that are used to store non-superseded data. That is, the storage system may identify which stripes 310 are used to store the most up-to-date data within the logical address range 0-1000.

For example, the metadata may indicate the physical addresses (e.g., physical offsets) where the non-superseded logical data 315 corresponding to logical offsets 0-1000 is stored. The storage system may map the physical addresses to the corresponding stripes 310 to identify which stripes 310 store non-superseded data. In the example of FIG. 3, the storage system may identify that stripes S2-0, S2-1, S1-2, SO-1, and SO-2 store non-superseded data based on the indicated physical addresses being within one of the stripes S2-0, S2-1, S1-2, SO-1, and SO-2. Because the stripes S1-0, S1-1, and S1-3 do not store any non-superseded data, no indicated physical addresses within the stripes S1-0, S1-1, and S1-3 may be indicated by the metadata. As such, the stripes S1-0, S1-1, and S1-3 may be excluded from the set of stripes 310 that were identified as storing non-superseded data, and may thus be considered unreachable. That is, no logical-to-physical mapping of non-superseded logical data 315 to a physical address within the stripes S1-0, S1-1, and S1-3 may exist. Accordingly, the storage system may delete the data stored at stripes S1-0, S1-1, and S1-3 after the expiration of the snapshot 305-b while retaining the data stored at stripe S1-2. In some examples, if all of the stripes S1 associated with the snapshot 305-b are reachable after its expiration, the storage system may retain all of the stripes S1. In some examples, if all of the stripes S1 associated with the snapshot 305-b are unreachable after its expiration, the storage system may delete all of the stripes S1 (e.g., delete the snapshot 305-b).

In some examples, the storage system may use a bitmap to track which stripes 310 are reachable and which stripes 310 are unreachable. For example, the bitmap may include bits that correspond to respective stripes S1, and the storage system may update the bitmap to indicate which stripes S1 are reachable, which stripes S1 are unreachable, or a combination thereof. For instance, if, during a dry read, the storage system identifies that a stripe S1 (e.g., stripe) S1-2 is reachable, the storage system may set the bit corresponding to the stripe S1 to a first logic state (e.g., logic state '1') to indicate that the stripe S1 is reachable. If the storage system identifies that a stripe S1 is unreachable (e.g., S1-0, S1-1, S1-3), the storage system may set the bit corresponding to the stripe S1 to a second logic state (e.g., logic state '0') to indicate that the stripe S1 is unreachable. In other words, bits corresponding to stripes S1 included in the set of stripes 310 identified as storing non-superseded data may be set to the first logic state, while bits corresponding to stripes S1 excluded from the set may be set to the second logic state. Using the bitmap, the storage system may delete the data from the stripes S1 with corresponding bits set to the second logic state.

In some examples, the bitmap may include bits that correspond to each of the stripes 310 (e.g., stripes SO, S1, and S2), and the storage system may update the bitmap to track which stripes 310 are reachable or unreachable. After expiration of the corresponding snapshot 305, the storage system may use the bitmap to delete and retain stripes 310 in accordance with the bitmap. That is, even if a stripe 310 is identified as being unreachable, the stripe 310 may not be deleted until after the corresponding snapshot 305 expires.

In some examples, at least a portion of a stripe 310 may be used to store index blocks of a snapshot 305. If a stripe 310 stores an index block, the storage system may be configured to retain the stripe 310 after expiration of the snapshot 305, for example, even if a remainder of the stripe 310 is used to store superseded data.

Figure 4:
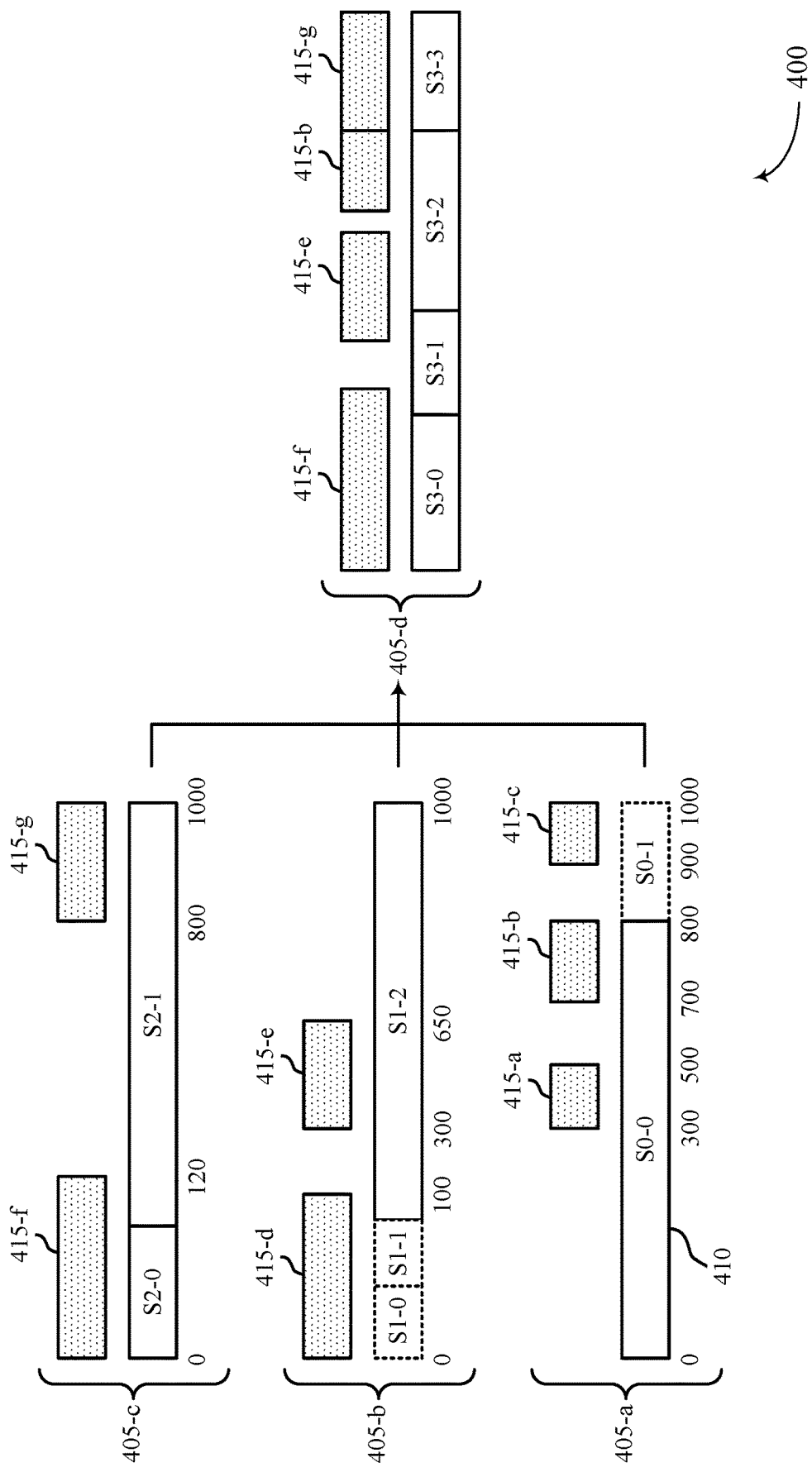

FIG. 4 illustrates an example of a consolidation diagram 400 that supports techniques for backup data consolidation in accordance with aspects of the present disclosure. The consolidation diagram 400 may be implemented by aspects of the computing environment 100 described with reference to FIGS. 1 through 3. For example, the consolidation diagram 400 may be implemented by a storage system as described herein, including with reference to FIGS. 1 through 3.

The consolidation diagram 400 depicts the merging of snapshots 405 in accordance with criteria that reduces a frequency at which snapshot merging is performed, which may reduce latency associated with a storage system performing other operations that would otherwise be delayed due to merging an expired and non-expired snapshot. For example, the storage system may store a snapshot 405-*a*, a snapshot 405-*b*, and a snapshot 405-*c*, which may be examples of incremental snapshots described herein, such as snapshots 305-*b* and 305-*c* described with reference to FIG. 3.

The snapshots 405 may include respective logical data 415 that corresponds to a logical address range (e.g., from logical offset 0-1000) associated with a file of a computing system. For example, the snapshot 405-*a* may include logical data 415-*a* corresponding to logical offsets 300-500, logical data 415-*b* corresponding to logical offsets 700-800, and logical data 415-*c* corresponding to logical offsets 900-1000. The snapshot 405-*b* may include logical data 415-*d* corresponding to logical offsets 0-100 and logical data 415-*e* corresponding to logical offsets 300-600. The snapshot 405-*c* may include logical data 415-*f* corresponding to logical offsets 0-120 and logical data 415-*g* corresponding to logical offsets 800-1000. The snapshots 405 may also indicate stripes 410 (e.g., stripes 510) at which the logical data 415 is physically stored. For example, the snapshot 405-*a* may indicate that stripes SO-0 and SO-1 are used to store the corresponding logical data 415, the snapshot 405-*b* may indicate that stripes S1-0, S1-1, and S1-2 are used to store the corresponding logical data 415, and the snapshot 405-*c* may indicate that stripes S2-0 and S2-1 are used to store the corresponding logical data 415.

The snapshot 405-*a* and the snapshot 405-*b* may be expired snapshots 405 and the snapshot 405-*c* may be non-expired. In accordance with techniques described herein, the storage system may identify that the stripes SO-1, S1-0, and S1-1 are unreachable stripes and delete the unreachable stripes SO-1, S1-0, and S1-1 based on the expiration of the snapshots 405-*a* and 405-*b*. The storage system may also identify that the stripes SO-0 and S1-2 are reachable stripes and may thus retain the stripes SO-0 and S1-2 after expiration of the snapshots 405-*a* and 405-*c*.

In some examples, the storage system may be configured to merge the snapshots 405-*a*, 405-*b*, and 405-*c* based on a quantity of expired (e.g., and non-merged) snapshots 405 satisfying (e.g., meeting or exceeding) a threshold quantity. For example, as a chain of snapshots 405 grows longer, read operation performance may decrease, for instance, due to an increased quantity of snapshots 405 being read as part of the read operation. Accordingly, the storage system may be configured to merge snapshots 405 (e.g., expired snapshots 405 with a non-expired snapshot 405) when a threshold quantity of snapshots 405 expire. For example, in the example of FIG. 4, the threshold quantity may be two expired snapshots 405. The storage system may identify that the snapshot 405-*a* and the snapshot 405-*b* are expired, and that the threshold quantity is therefore satisfied. Based on the threshold quantity being satisfied, the storage system may create a new snapshot 405-*d* that includes the non-superseded logical data 415 from the snapshots 405-*a*, 405-*b*, and 405-*c*. For example, the storage system may merge the snapshots 405-*a*, 405-*b*, and 405-*c* to create the snapshot 405-*d* that includes the non-superseded logical data 415-*f*, 415-*e*, 415-*b*, and 415-*g* from the corresponding snapshots 405. The storage system may store the non-superseded logical data 415 associated with the snapshot 405-*d* at corresponding stripes S3 (e.g., S3-0, S3-1, S3-2, and S3-3). To free storage space, the storage system may delete the snapshots 405-*a* and 405-*b* after the merge but may retain the snapshot 405-*c*, for example, based on the snapshot 405-*c* being non-expired. In this way, the chain of snapshots 405 may be reduced and read performance may be increased.

In some examples, the storage system may be configured to merge the snapshots 405-*a*, 405-*b*, and 405-*c* based on a quantity of leaked data satisfying a threshold. For example, leaked data may correspond to data that is retained in a stripe 410 of an expired snapshot 405 but that is superseded data. For example, the stripe SO-0 may be retained after expiration of the snapshot 405-*a* based on storing the non-superseded data corresponding to logical data 415-*b*. However, the logical data 415-*a* may be superseded by the logical data 415-*e*, and thus the storage space of stripe SO-0 used to store the logical data 415-*a* may be wasted or "leaked." Similarly, because the logical data 415-*d* is superseded by the logical data 415-*f*, the stripe S1-2 may also be used to store leaked data. The storage system may track the quantity of leaked data associated with expired snapshots 405 that is retained and may be configured to merge snapshots 405 based on the quantity of leaked data satisfying (e.g., meeting or exceeding) the threshold. For example, if the quantity of superseded data retained at the stripes SO-0 and S1-2 satisfies the threshold, the storage system may be configured to create the snapshot 405-*d*. In this way, additional storage space may be made available while reducing a frequency at which snapshots 405 are merged.

In some examples, a latency associated with merging the snapshots 405 may be reduced based on deleting stripes 410 post-expiration. For example, to create the snapshot 405-*d*, the storage system may read the data included in the snapshots 405-*a*, 405-*b*, and 405-*c*, determine which data is non-superseded, and write the non-superseded data to the stripes S3. By deleting the stripes SO-1, S1-0, and S1-1 before creating the snapshot 405-*d*, such that the stripes SO-1, S1-0, and S1-1 need not be read in connection with creating the snapshot 405-*d*, the storage system may reduce a quantity of data that is read as part of the merge operation, thereby reducing a latency of the merge operation.

Figure 5:
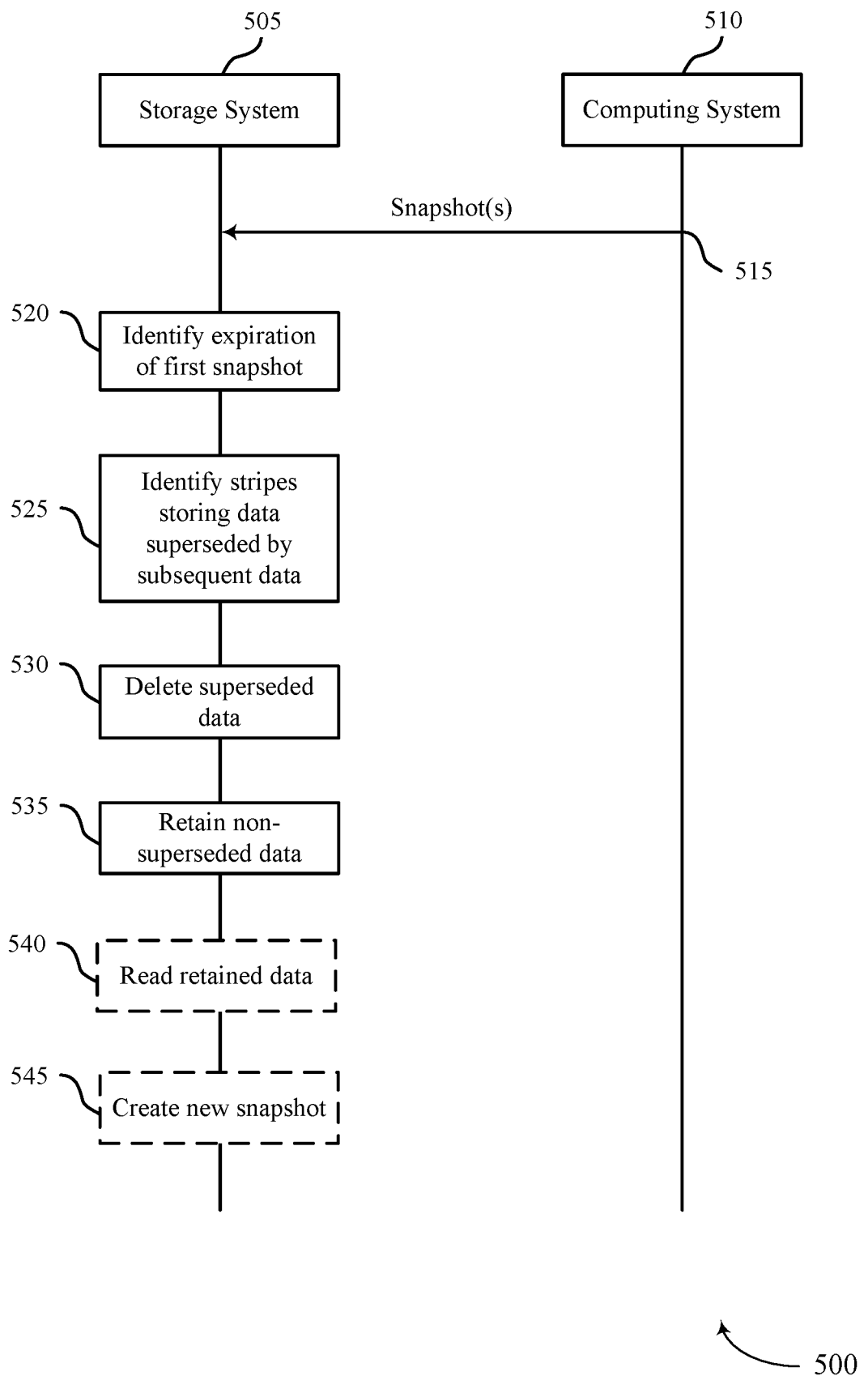
FIG. 5 illustrates an example of a process flow that supports techniques for backup data consolidation in accordance with aspects of the present disclosure.

FIG. 5 illustrates an example of a process flow 500 that supports techniques for backup data consolidation in accordance with aspects of the present disclosure. The process flow 500 may implement or be implemented by aspects of the computing environments described with reference to FIGS. 1 through 4. For example, the process flow 500 may be implemented by a storage system 505 and a computing system 510 to support the freeing of storage space associated with expired snapshots without re-writing data to new stripes.

The storage system 505 may be an example of a storage system (e.g., a DMS 110) as described with reference to FIGS. 1 through 4. The computing system 510 may be an example of a computing system 105 as described with reference to FIGS. 1 through 4. In the following description of the process flow 500, the operations between the storage system 505 and the computing system 510 may be communicated in a different order than the example order shown, or the operations performed by the storage system 505 and the computing system 510 may be performed in different orders or at different times. Some operations may also be omitted from the process flow 500, and other operations may be added to the process flow 500. Further, although some operations or signaling may be shown to occur at different times for discussion purposes, these operations may actually occur at the same time.

At 515, the storage system may capture one or more snapshots of the computing system 510 corresponding to one or more different points in time. For example, the storage system may perform a first backup procedure for the computing system 510 to store a first snapshot of first data of the computing system at a first time. The storage system may also perform a second backup procedure at a second time after the first time to store a second snapshot of second data of the computing system at the second time. The first snapshot and the second snapshot may respectively indicate a first set of stripes and a second set of stripes within the storage system 505 to which the first data and the second data are stored. Additionally, a first portion of the first data may be superseded by a portion of the second data. In some examples, the first snapshot and the second snapshot may be incremental snapshots.

At 520, the storage system 505 may identify an expiration of the first snapshot. In some examples, the storage system 505 may identify that the first snapshot has expired. In some examples, the storage system 505 may identify an upcoming expiration of the first snapshot (e.g., that the first snapshot will expire in 1 hour, or in some other time period).

At 525, based on expiration of the first snapshot, the storage system 505 may identify which stripes of the first set store data that is superseded by the subsequent data of the second snapshot. That is, the storage system 505 may identify a first subset of stripes of the first set that store the first portion of the first data that is superseded by the second data. The storage system 505 may also identify a second subset of stripes of the first set that store a second portion of the first data that is non-superseded (e.g., and which may store some superseded data). In other words, the storage system 505 may identify which stripes of the first set are unreachable and which stripes of the first set are reachable. In some examples, the storage system 505 may identify the first subset of stripes and the second subset of stripes by performing a dry read of metadata associated with the first snapshot, the second snapshot, one or more additional snapshots, or any combination thereof.

At 530, after identifying the first subset of stripes, the storage system 505 may delete the first portion of the first data from the first subset of stripes, thereby freeing the storage space of the first subset of stripes for other uses.

At 535, after the expiration of the first snapshot, the storage system 505 may retain the second portion of the first data that is non-superseded at the second subset of stripes. For example, based on the second subset of stripes being reachable, the storage system 505 may retain the second subset of stripes (e.g., including any superseded data stored in the second subset of stripes).

At 540, the storage system 505 may read retained data stored in the second subset of stripes. For example, because the second portion of the first data is retained at the second subset of stripes rather than being merged to create a new snapshot, the storage system 505 may read data included in the second portion of the first data from one or more stripes of the second subset of stripes.

At 545, create a new snapshot based on the second snapshot and a set of expired snapshots including the first snapshot. For example, the storage system 505 may identify that a quantity of expired snapshots included in the set of expired snapshots may satisfy a threshold quantity and may merge the set of expired snapshots with the second snapshot to create the new snapshot. Additionally or alternatively, the storage system may identify that a quantity of leaked data associated with the set of expired snapshots satisfies a threshold and may merge the set of expired snapshots with the second snapshot to create the new snapshot. The storage system 505 may delete the set of expired snapshots based on the merge and may retain the second snapshot based on the second snapshot being non-expired.

Figure 6:
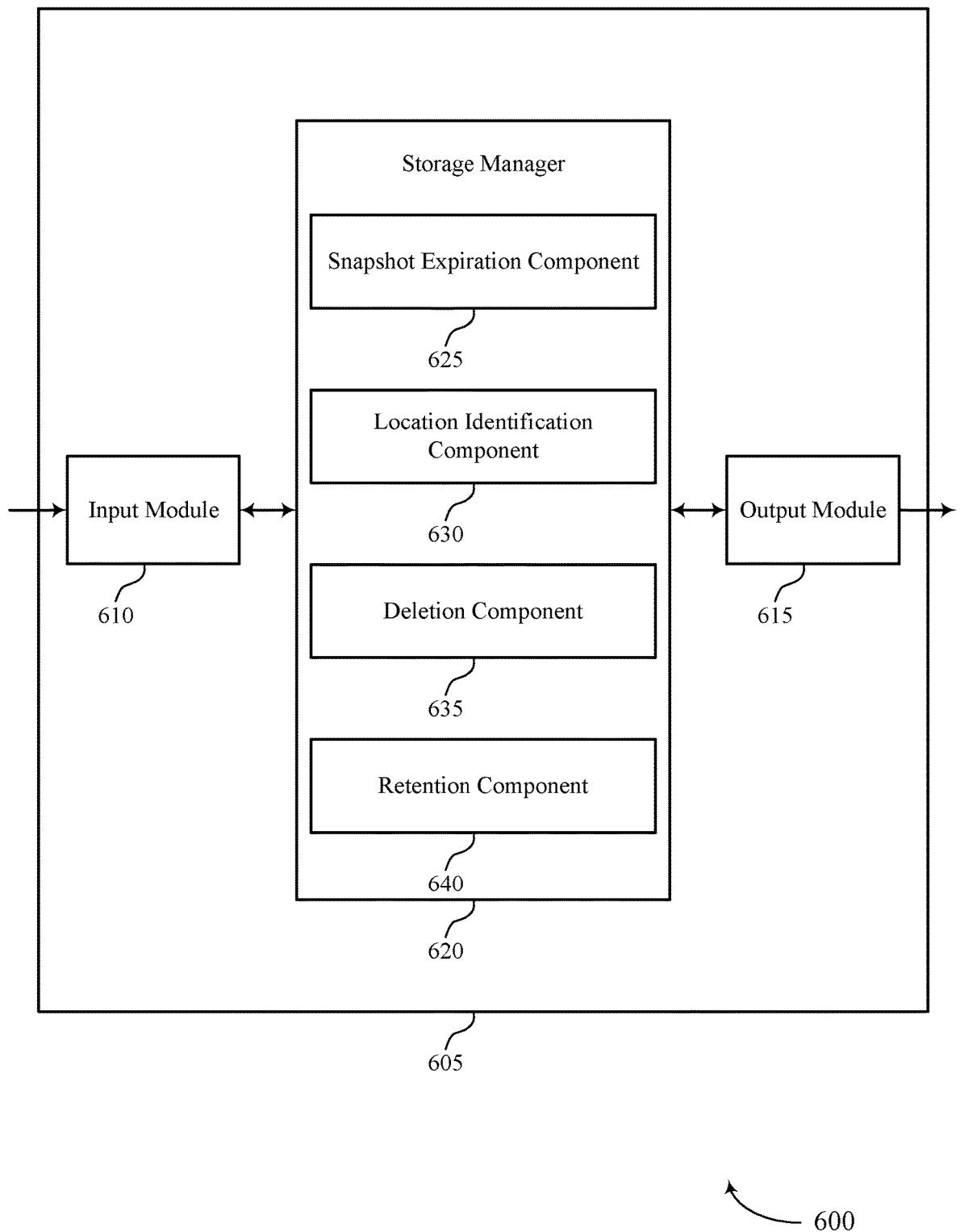
FIG. 6 shows a block diagram of an apparatus that supports techniques for backup data consolidation in accordance with aspects of the present disclosure.

FIG. 6 shows a block diagram 600 of a device 605 that supports techniques for backup data consolidation in accordance with aspects of the present disclosure. In some examples, the device 605 may be an example of aspects of a storage system (e.g., a DMS 110) as described herein. The device 605 may include an input module 610, an output module 615, and a storage manager 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the storage manager 620 to support techniques for backup data consolidation. In some cases, the input module 610 may be a component of a network interface 810 as described with reference to FIG. 8.

The output module 615 may manage output signals for the device 605. For example, the output module 615 may receive signals from other components of the device 605, such as the storage manager 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of a network interface 810 as described with reference to FIG. 8.

The storage manager 620 may include a snapshot expiration component 625, a location identification component 630, a deletion component 635, a retention component 640, or any combination thereof. In some examples, the storage manager 620, or various components thereof, may be configured to perform various operations (e.g., receiving, monitoring, transmitting) using or otherwise in cooperation with the input module 610, the output module 615, or both. For example, the storage manager 620 may receive information from the input module 610, send information to the output module 615, or be integrated in combination with the input module 610, the output module 615, or both to receive information, transmit information, or perform various other operations as described herein.

The storage manager 620 may support data management in accordance with examples as disclosed herein. The snapshot expiration component 625 may be configured as or otherwise support a means for identifying an expiration of a first snapshot of a computing system, where the first snapshot indicates a first set of physical storage locations within a storage system to which first data of the computing system was stored as part of a first backup procedure for the computing system. The location identification component 630 may be configured as or otherwise support a means for identifying, based on the expiration of the first snapshot, a first subset of the first set of physical storage locations as storing a first portion of the first data that is superseded by second data associated with a second snapshot of the computing system, the second data stored to a second set of physical storage locations within the storage system as part of a second backup procedure for the computing system subsequent to the first backup procedure. The deletion component 635 may be configured as or otherwise support a means for deleting, after identifying the first subset of the first set of physical storage locations, the first portion of the first data from the first subset of the first set of physical storage locations. The retention component 640 may be configured as or otherwise support a means for retaining, after the expiration of the first snapshot, a second portion of the first data at a second subset of the first set of physical storage locations.

Figure 7:
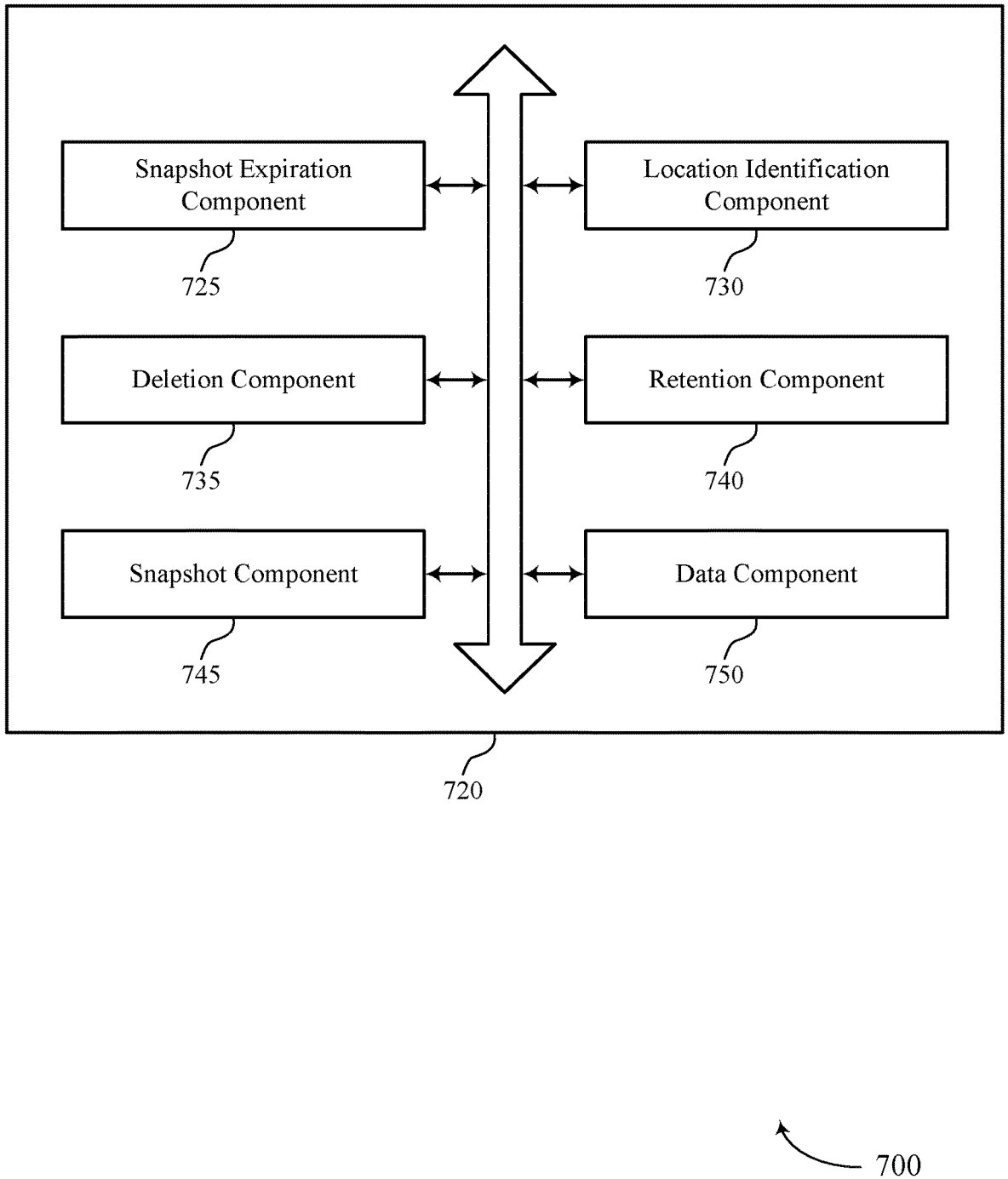
FIG. 7 shows a block diagram of a storage manager that supports techniques for backup data consolidation in accordance with aspects of the present disclosure.

FIG. 7 shows a block diagram 700 of a storage manager 720 that supports techniques for backup data consolidation in accordance with aspects of the present disclosure. The storage manager 720 may be an example of aspects of a storage manager or a storage manager 620, or both, as described herein. The storage manager 720, or various components thereof, may be an example of means for performing various aspects of techniques for backup data consolidation as described herein. For example, the storage manager 720 may include a snapshot expiration component 725, a location identification component 730, a deletion component 735, a retention component 740, a snapshot component 745, a data component 750, or any combination thereof. Each of these components may communicate, directly or indirectly, with one another (e.g., via one or more buses).

The storage manager 720 may support data management in accordance with examples as disclosed herein. The snapshot expiration component 725 may be configured as or otherwise support a means for identifying an expiration of a first snapshot of a computing system, where the first snapshot indicates a first set of physical storage locations within a storage system to which first data of the computing system was stored as part of a first backup procedure for the computing system. The location identification component 730 may be configured as or otherwise support a means for identifying, based on the expiration of the first snapshot, a first subset of the first set of physical storage locations as storing a first portion of the first data that is superseded by second data associated with a second snapshot of the computing system, the second data stored to a second set of physical storage locations within the storage system as part of a second backup procedure for the computing system subsequent to the first backup procedure. The deletion component 735 may be configured as or otherwise support a means for deleting, after identifying the first subset of the first set of physical storage locations, the first portion of the first data from the first subset of the first set of physical storage locations. The retention component 740 may be configured as or otherwise support a means for retaining, after the expiration of the first snapshot, a second portion of the first data at a second subset of the first set of physical storage locations.

In some examples, the snapshot expiration component 725 may be configured as or otherwise support a means for identifying that a quantity of snapshots included in a set of expired snapshots satisfies a threshold quantity, the set of expired snapshots including the first snapshot. In some examples, the snapshot component 745 may be configured as or otherwise support a means for creating, based on the quantity of snapshots satisfying the threshold quantity, a third snapshot including the second data associated with the second snapshot and non-superseded (e.g., and hence retained) data stored at respective subsets of physical storage locations indicated by the set of expired snapshots.

In some examples, the retention component 740 may be configured as or otherwise support a means for identifying that a quantity of data retained at respective physical storage locations indicated by a set of expired snapshots and superseded by subsequently stored data satisfies a threshold, the set of expired snapshots including the first snapshot. In some examples, the snapshot component 745 may be configured as or otherwise support a means for creating, based on the quantity of data retained at the respective physical storage locations satisfying the threshold, a third snapshot including the second data associated with the second snapshot and retained data stored at the respective physical storage locations that is not superseded by the subsequent data.

In some examples, the location identification component 730 may be configured as or otherwise support a means for identifying, for each physical storage location within the first subset, that an entirety of the physical storage location stores a respective portion of the first data that is superseded by the second data, where the first portion of the first data is deleted from the first subset based on an entirety of each physical storage location within first subset storing superseded data.

In some examples, a first portion of a physical storage location of the second subset stores a third portion of the first data that is superseded by the second data and a second portion of the physical storage location stores a fourth portion of the first data that is not superseded by the second data. In some examples, after the first portion of the first data is deleted, the third portion of the first data and the fourth portion of the first data are retained at the physical storage location based on the fourth portion of the first data not being superseded by the second data.

In some examples, at least a portion of each physical storage location within the second subset stores a respective portion of the first data that is not superseded by the second data. In some examples, the second portion of the first data is retained at the second subset based on each physical storage location within the second subset storing non-superseded data.

In some examples, the location identification component 730 may be configured as or otherwise support a means for reading metadata associated with the first snapshot and the second snapshot to identify a set of physical storage locations from the first set and the second set that store non-superseded data of the computing system, where the first subset of the first set of physical storage locations are excluded from the identified set of physical storage locations, and where the first subset of the first set of physical storage locations are identified as storing the first portion of the first data that is superseded by the second data based on being excluded from the identified set of physical storage locations.

In some examples, the metadata indicates physical addresses at which the non-superseded data is stored, and the location identification component 730 may be configured as or otherwise support a means for mapping the indicated physical addresses to the set of physical storage locations based on the physical storage locations of the set of physical storage locations corresponding to address ranges that include the physical addresses, where the set of physical storage locations is identified based on the mapping.

In some examples, the location identification component 730 may be configured as or otherwise support a means for updating a bitmap to indicate that the first subset of the first set of physical storage locations store superseded data based on the first subset of the first set of physical storage locations being excluded from the identified set of physical storage locations, where bits of the bitmap correspond to respective physical storage locations within the first set.

In some examples, the metadata includes index information associated with the first snapshot, the second snapshot, an additional snapshot, or any combination thereof, the index information indicating respective physical addresses at which the first data, the second data, additional data associated with the additional snapshot, or any combination thereof, are stored.

In some examples, the data component 750 may be configured as or otherwise support a means for reading data of the second portion of the first data from a physical storage location of the second subset after deleting the first portion of the first data and based on retaining the second portion of the first data at the second subset.

Figure 8:
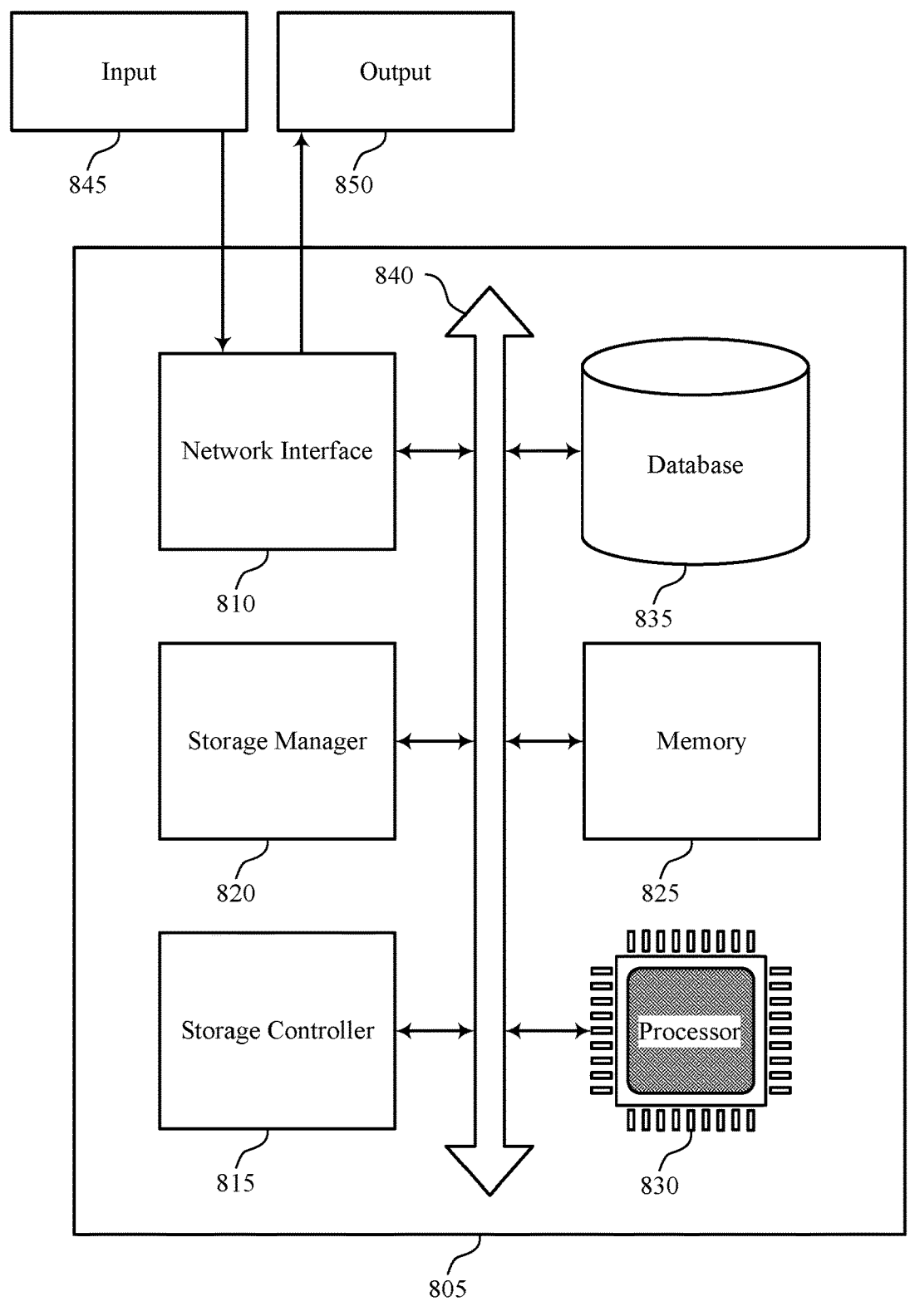
FIG. 8 shows a diagram of a system including a device that supports techniques for backup data consolidation in accordance with aspects of the present disclosure.

FIG. 8 shows a diagram of a system 800 including a device 805 that supports techniques for backup data consolidation in accordance with aspects of the present disclosure. The device 805 may be an example of or include the components of a device 605 as described herein. The device 805 may include components for communications for supporting backup and recovery procedures including components for transmitting and receiving communications, such as a storage manager 820, a network interface 810, a storage controller 815, a memory 825, a processor 830, and a database 835. These components may be in electronic communication or otherwise coupled (e.g., operatively, communicatively, functionally, electronically, electrically) via one or more buses (e.g., a bus 840).

The network interface 810 may manage input signals 845 and output signals 850 for the device 805. The network interface 810 may also manage communications with data sources not integrated into the device 805. In some cases, the network interface 810 may represent a physical connection, a wired connection, a wireless connection, or port to an external peripheral. In some cases, the network interface 810 may utilize an operating system such as iOS®, ANDROID®, MS-DOS®, MS-WINDOWS®, OS/2®, UNIX®, LINUX®, or another known operating system. In other cases, the network interface 810 may represent or interact with one or more data sources (e.g., servers, data storage appliances, databases, cloud storage systems) or one or more devices or peripherals such as a modem, a keyboard, a mouse, a touchscreen, or a similar device. In some cases, the network interface 810 may be implemented as part of a processor 830. In some examples, a user may interact with the device 805 via the network interface 810 or via hardware components controlled by the network interface 810.

The storage controller 815 may manage data storage and processing in a database 835. In some cases, a user may interact with the storage controller 815. In other cases, the storage controller 815 may operate automatically without user interaction. The database 835 may be an example of a single database, a distributed database, multiple distributed databases, a data store, a data lake, or an emergency backup database.

Memory 825 may include RAM and ROM. The memory 825 may store computer-readable, computer-executable software including instructions that, when executed, cause the processor 830 to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting techniques for backup data consolidation).

The storage manager 820 may support data management in accordance with examples as disclosed herein. For example, the storage manager 820 may be configured as or otherwise support a means for identifying an expiration of a first snapshot of a computing system, where the first snapshot indicates a first set of physical storage locations within a storage system to which first data of the computing system was stored as part of a first backup procedure for the computing system. The storage manager 820 may be configured as or otherwise support a means for identifying, based on the expiration of the first snapshot, a first subset of the first set of physical storage locations as storing a first portion of the first data that is superseded by second data associated with a second snapshot of the computing system, the second data stored to a second set of physical storage locations within the storage system as part of a second backup procedure for the computing system subsequent to the first backup procedure. The storage manager 820 may be configured as or otherwise support a means for deleting, after identifying the first subset of the first set of physical storage locations, the first portion of the first data from the first subset of the first set of physical storage locations. The storage manager 820 may be configured as or otherwise support a means for retaining, after the expiration of the first snapshot, a second portion of the first data at a second subset of the first set of physical storage locations.

By including or configuring the storage manager 820 in accordance with examples as described herein, the device 805 may support techniques for deleting superseded data from physical storage locations (e.g., stripes) associated with expired snapshots without consolidating together multiple snapshots, thereby increasing available storage of a storage system, improve storage efficiency, reduce a frequency of merging snapshots, and improve read and write performance at the storage system, among other benefits.

Figure 9:
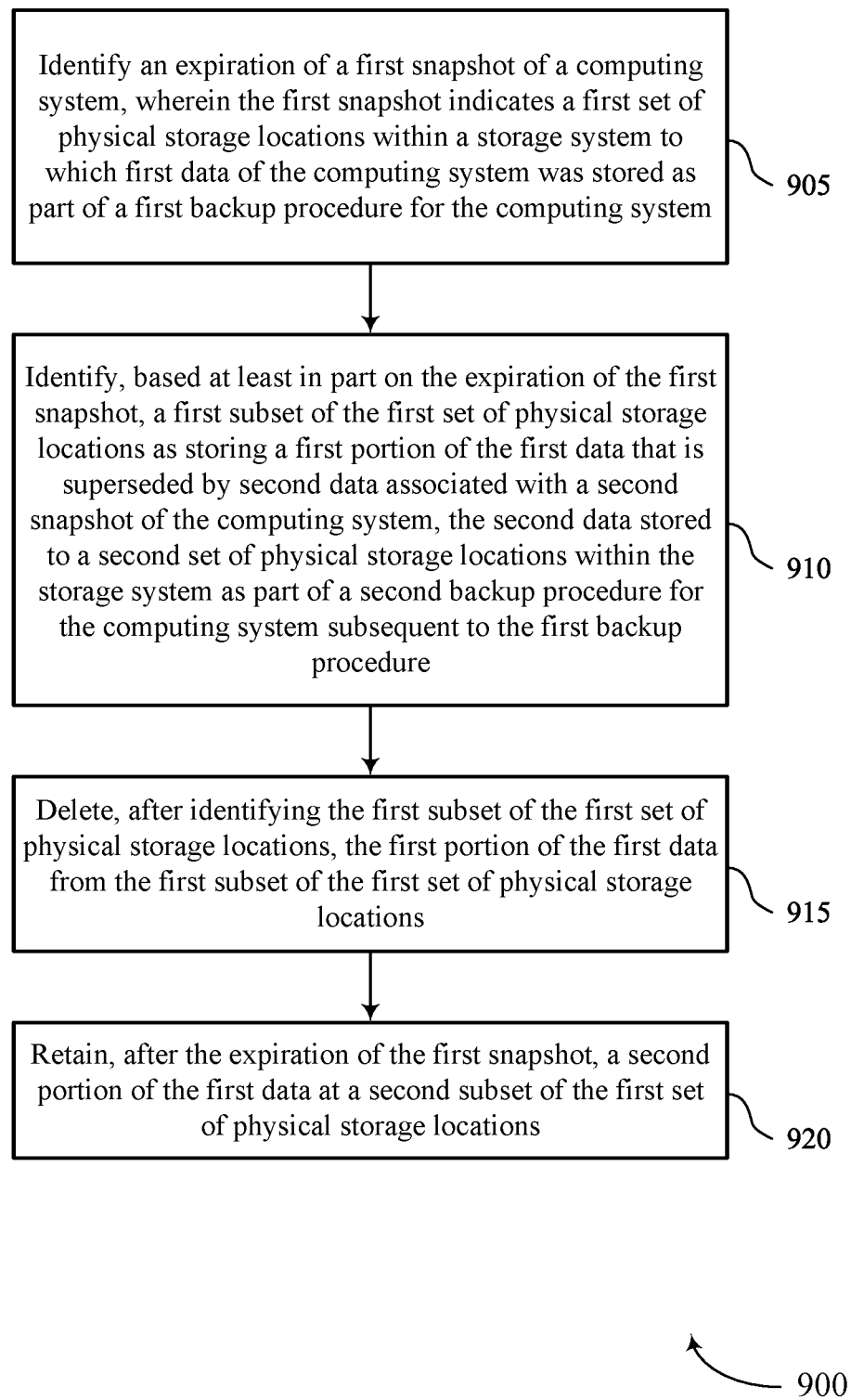
FIGS. 9 through 12 show flowcharts illustrating methods that support techniques for backup data consolidation in accordance with aspects of the present disclosure.

FIG. 9 shows a flowchart illustrating a method 900 that supports techniques for backup data consolidation in accordance with aspects of the present disclosure. The operations of the method 900 may be implemented by a storage system or its components as described herein. For example, the operations of the method 900 may be performed by a storage system as described with reference to FIGS. 1 through 8. In some examples, a storage system may execute a set of instructions to control the functional elements of the storage system to perform the described functions. Additionally, or alternatively, the storage system may perform aspects of the described functions using special-purpose hardware.

At 905, the method may include identifying an expiration of a first snapshot of a computing system, where the first snapshot indicates a first set of physical storage locations within a storage system to which first data of the computing system was stored as part of a first backup procedure for the computing system. The operations of 905 may be performed in accordance with examples as disclosed herein. In some examples, aspects of the operations of 905 may be performed by a snapshot expiration component 725 as described with reference to FIG. 7.

At 910, the method may include identifying, based on the expiration of the first snapshot, a first subset of the first set of physical storage locations as storing a first portion of the first data that is superseded by second data associated with a second snapshot of the computing system, the second data stored to a second set of physical storage locations within the storage system as part of a second backup procedure for the computing system subsequent to the first backup procedure. The operations of 910 may be performed in accordance with examples as disclosed herein. In some examples, aspects of the operations of 910 may be performed by a location identification component 730 as described with reference to FIG. 7.

At 915, the method may include deleting, after identifying the first subset of the first set of physical storage locations, the first portion of the first data from the first subset of the first set of physical storage locations. The operations of 915 may be performed in accordance with examples as disclosed herein. In some examples, aspects of the operations of 915 may be performed by a deletion component 735 as described with reference to FIG. 7.

At 920, the method may include retaining, after the expiration of the first snapshot, a second portion of the first data at a second subset of the first set of physical storage locations. The operations of 920 may be performed in accordance with examples as disclosed herein. In some examples, aspects of the operations of 920 may be performed by a retention component 740 as described with reference to FIG. 7.

Figure 10:
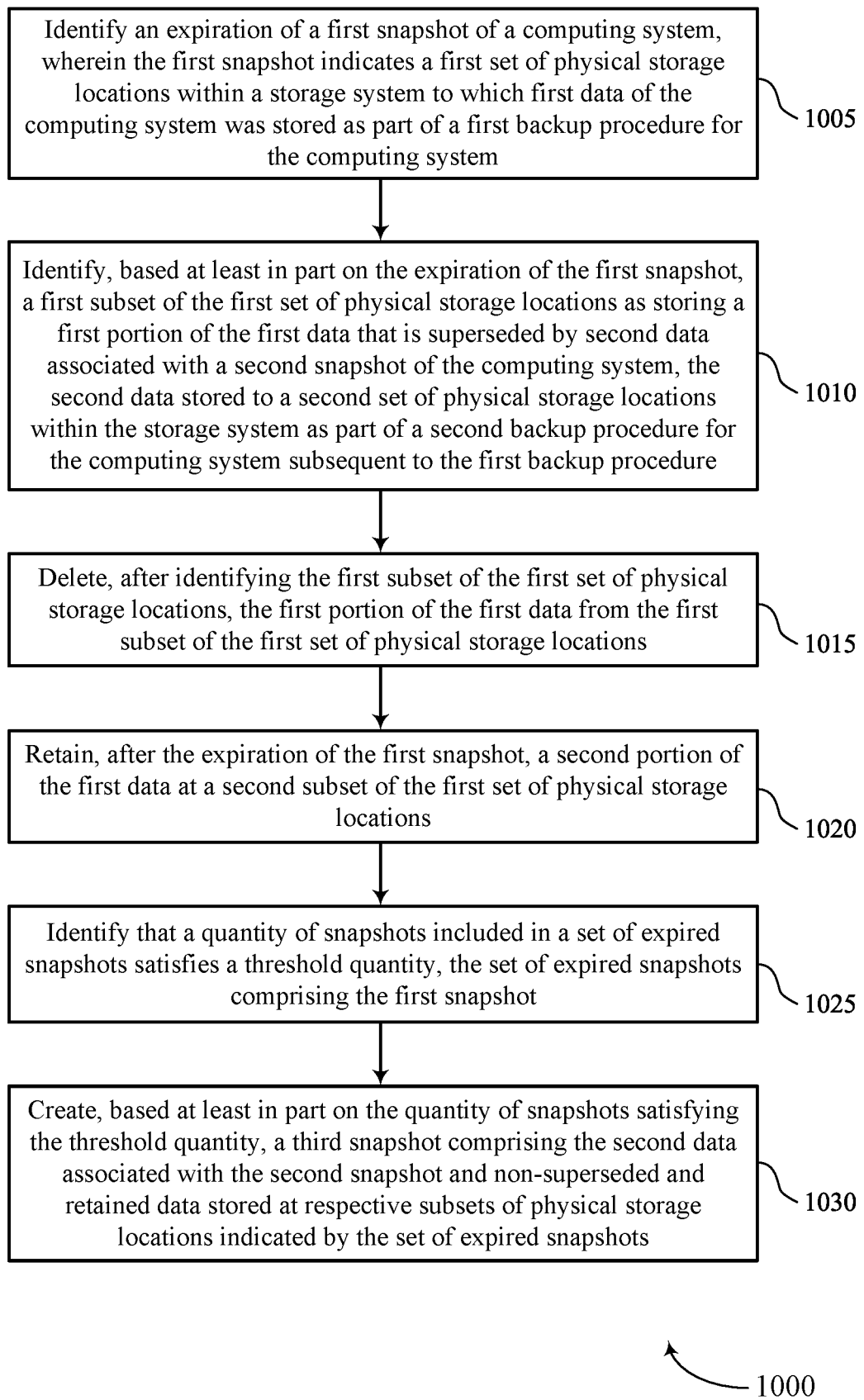

FIG. 10 shows a flowchart illustrating a method 1000 that supports techniques for backup data consolidation in accordance with aspects of the present disclosure. The operations of the method 1000 may be implemented by a storage system or its components as described herein. For example, the operations of the method 1000 may be performed by a storage system as described with reference to FIGS. 1 through 8. In some examples, a storage system may execute a set of instructions to control the functional elements of the storage system to perform the described functions. Additionally, or alternatively, the storage system may perform aspects of the described functions using special-purpose hardware.

At 1005, the method may include identifying an expiration of a first snapshot of a computing system, where the first snapshot indicates a first set of physical storage locations within a storage system to which first data of the computing system was stored as part of a first backup procedure for the computing system. The operations of 1005 may be performed in accordance with examples as disclosed herein. In some examples, aspects of the operations of 1005 may be performed by a snapshot expiration component 725 as described with reference to FIG. 7.

At 1010, the method may include identifying, based on the expiration of the first snapshot, a first subset of the first set of physical storage locations as storing a first portion of the first data that is superseded by second data associated with a second snapshot of the computing system, the second data stored to a second set of physical storage locations within the storage system as part of a second backup procedure for the computing system subsequent to the first backup procedure. The operations of 1010 may be performed in accordance with examples as disclosed herein. In some examples, aspects of the operations of 1010 may be performed by a location identification component 730 as described with reference to FIG. 7.

At 1015, the method may include deleting, after identifying the first subset of the first set of physical storage locations, the first portion of the first data from the first subset of the first set of physical storage locations. The operations of 1015 may be performed in accordance with examples as disclosed herein. In some examples, aspects of the operations of 1015 may be performed by a deletion component 735 as described with reference to FIG. 7.

At 1020, the method may include retaining, after the expiration of the first snapshot, a second portion of the first data at a second subset of the first set of physical storage locations. The operations of 1020 may be performed in accordance with examples as disclosed herein. In some examples, aspects of the operations of 1020 may be performed by a retention component 740 as described with reference to FIG. 7.

At 1025, the method may include identifying that a quantity of snapshots included in a set of expired snapshots satisfies a threshold quantity, the set of expired snapshots including the first snapshot. The operations of 1025 may be performed in accordance with examples as disclosed herein. In some examples, aspects of the operations of 1025 may be performed by a snapshot expiration component 725 as described with reference to FIG. 7.

At 1030, the method may include creating, based on the quantity of snapshots satisfying the threshold quantity, a third snapshot including the second data associated with the second snapshot and non-superseded data stored at respective subsets of physical storage locations indicated by the set of expired snapshots. The operations of 1030 may be performed in accordance with examples as disclosed herein. In some examples, aspects of the operations of 1030 may be performed by a snapshot component 745 as described with reference to FIG. 7.

Figure 11:
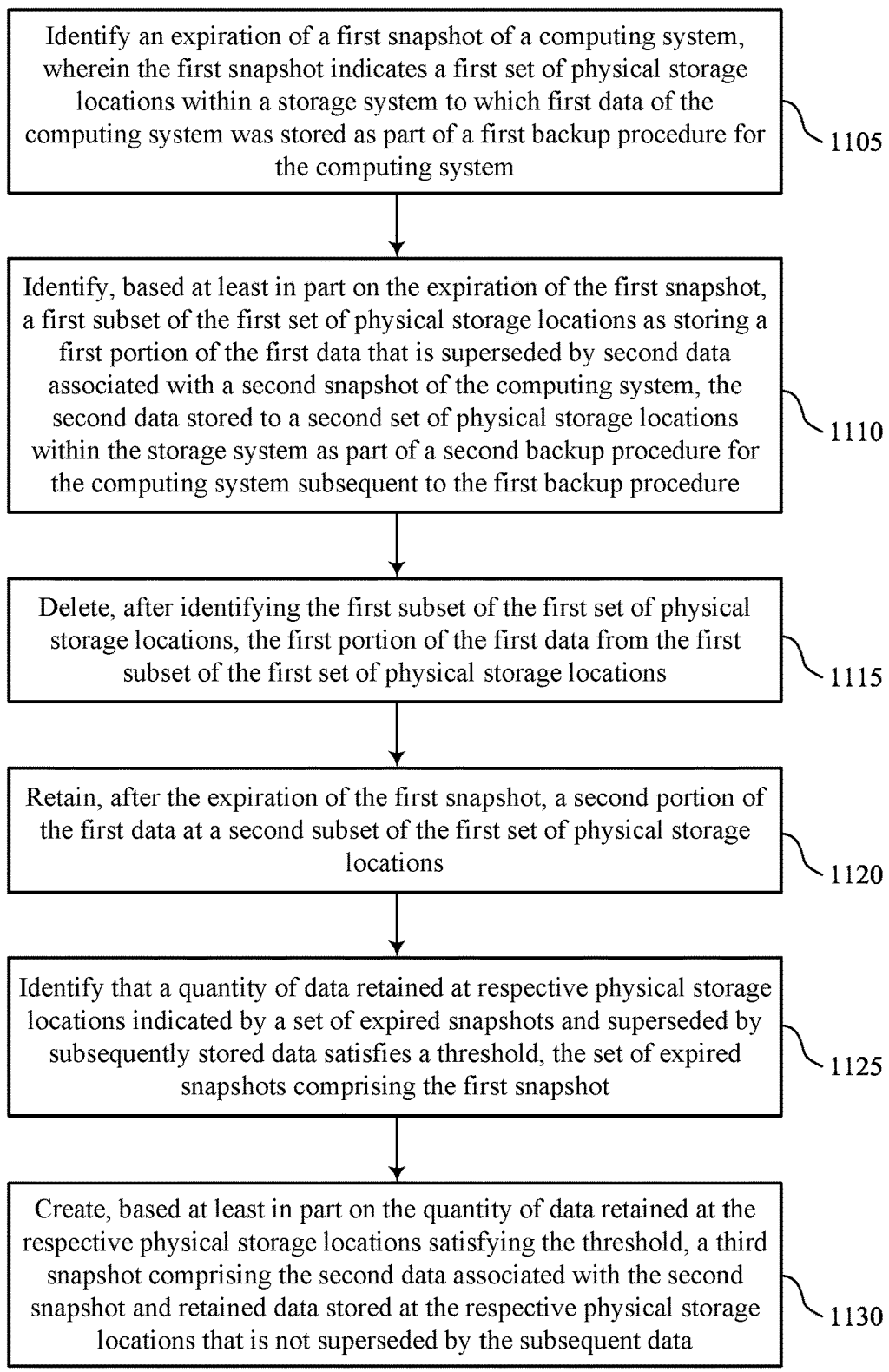

FIG. 11 shows a flowchart illustrating a method 1100 that supports techniques for backup data consolidation in accordance with aspects of the present disclosure. The operations of the method 1100 may be implemented by a storage system or its components as described herein. For example, the operations of the method 1100 may be performed by a storage system as described with reference to FIGS. 1 through 8. In some examples, a storage system may execute a set of instructions to control the functional elements of the storage system to perform the described functions. Additionally, or alternatively, the storage system may perform aspects of the described functions using special-purpose hardware.

At 1105, the method may include identifying an expiration of a first snapshot of a computing system, where the first snapshot indicates a first set of physical storage locations within a storage system to which first data of the computing system was stored as part of a first backup procedure for the computing system. The operations of 1105 may be performed in accordance with examples as disclosed herein. In some examples, aspects of the operations of 1105 may be performed by a snapshot expiration component 725 as described with reference to FIG. 7.

At 1110, the method may include identifying, based on the expiration of the first snapshot, a first subset of the first set of physical storage locations as storing a first portion of the first data that is superseded by second data associated with a second snapshot of the computing system, the second data stored to a second set of physical storage locations within the storage system as part of a second backup procedure for the computing system subsequent to the first backup procedure. The operations of 1110 may be performed in accordance with examples as disclosed herein. In some examples, aspects of the operations of 1110 may be performed by a location identification component 730 as described with reference to FIG. 7.

At 1115, the method may include deleting, after identifying the first subset of the first set of physical storage locations, the first portion of the first data from the first subset of the first set of physical storage locations. The operations of 1115 may be performed in accordance with examples as disclosed herein. In some examples, aspects of the operations of 1115 may be performed by a deletion component 735 as described with reference to FIG. 7.

At 1120, the method may include retaining, after the expiration of the first snapshot, a second portion of the first data at a second subset of the first set of physical storage locations. The operations of 1120 may be performed in accordance with examples as disclosed herein. In some examples, aspects of the operations of 1120 may be performed by a retention component 740 as described with reference to FIG. 7.

At 1125, the method may include identifying that a quantity of data retained at respective physical storage locations indicated by a set of expired snapshots and superseded by subsequently stored data satisfies a threshold, the set of expired snapshots including the first snapshot. The operations of 1125 may be performed in accordance with examples as disclosed herein. In some examples, aspects of the operations of 1125 may be performed by a retention component 740 as described with reference to FIG. 7.

At 1130, the method may include creating, based on the quantity of data retained at the respective physical storage locations satisfying the threshold, a third snapshot including the second data associated with the second snapshot and retained data stored at the respective physical storage locations that is not superseded by the subsequent data. The operations of 1130 may be performed in accordance with examples as disclosed herein. In some examples, aspects of the operations of 1130 may be performed by a snapshot component 745 as described with reference to FIG. 7.

Figure 12:
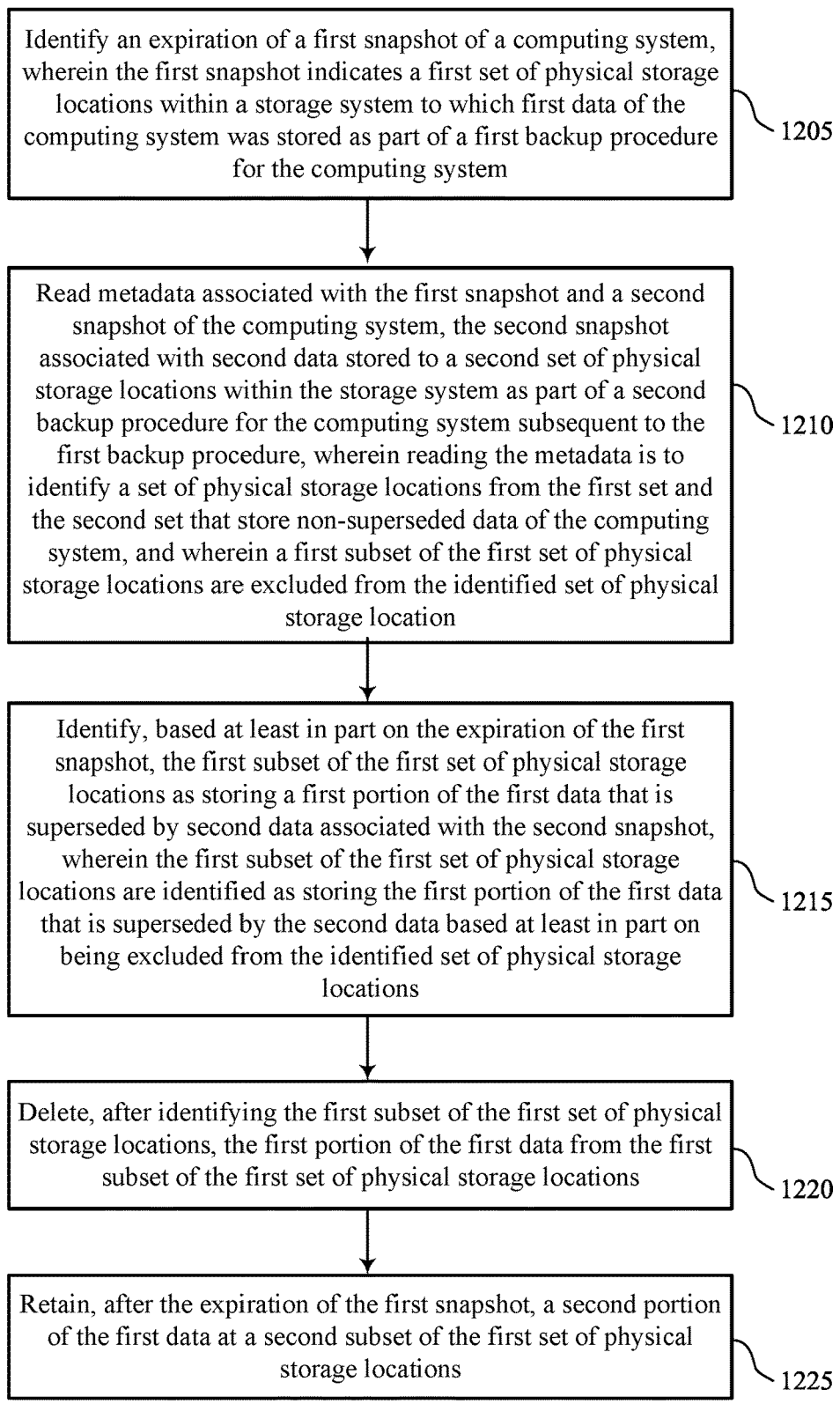

FIG. 12 shows a flowchart illustrating a method 1200 that supports techniques for backup data consolidation in accordance with aspects of the present disclosure. The operations of the method 1200 may be implemented by a storage system or its components as described herein. For example, the operations of the method 1200 may be performed by a storage system as described with reference to FIGS. 1 through 8. In some examples, a storage system may execute a set of instructions to control the functional elements of the storage system to perform the described functions. Additionally, or alternatively, the storage system may perform aspects of the described functions using special-purpose hardware.

At 1205, the method may include identifying an expiration of a first snapshot of a computing system, where the first snapshot indicates a first set of physical storage locations within a storage system to which first data of the computing system was stored as part of a first backup procedure for the computing system. The operations of 1205 may be performed in accordance with examples as disclosed herein. In some examples, aspects of the operations of 1205 may be performed by a snapshot expiration component 725 as described with reference to FIG. 7.

At 1210, the method may include reading metadata associated with the first snapshot and a second snapshot of the computing system, the second snapshot associated with second data stored to a second set of physical storage locations within the storage system as part of a second backup procedure for the computing system subsequent to the first backup procedure, where reading the metadata is to identify a set of physical storage locations from the first set and the second set that store non-superseded data of the computing system, and where a first subset of the first set of physical storage locations are excluded from the identified set of physical storage location. The operations of 1210 may be performed in accordance with examples as disclosed herein. In some examples, aspects of the operations of 1210 may be performed by a location identification component 730 as described with reference to FIG. 7.

At 1215, the method may include identifying, based on the expiration of the first snapshot, the first subset of the first set of physical storage locations as storing a first portion of the first data that is superseded by second data associated with the second snapshot, where the first subset of the first set of physical storage locations are identified as storing the first portion of the first data that is superseded by the second data based on being excluded from the identified set of physical storage locations. The operations of 1215 may be performed in accordance with examples as disclosed herein. In some examples, aspects of the operations of 1215 may be performed by a location identification component 730 as described with reference to FIG. 7.

At 1220, the method may include deleting, after identifying the first subset of the first set of physical storage locations, the first portion of the first data from the first subset of the first set of physical storage locations. The operations of 1220 may be performed in accordance with examples as disclosed herein. In some examples, aspects of the operations of 1220 may be performed by a deletion component 735 as described with reference to FIG. 7.

At 1225, the method may include retaining, after the expiration of the first snapshot, a second portion of the first data at a second subset of the first set of physical storage locations. The operations of 1225 may be performed in accordance with examples as disclosed herein. In some examples, aspects of the operations of 1225 may be performed by a retention component 740 as described with reference to FIG. 7.

A method for data management is described. The method may include identifying an expiration of a first snapshot of a computing system, where the first snapshot indicates a first set of physical storage locations within a storage system to which first data of the computing system was stored as part of a first backup procedure for the computing system, identifying, based on the expiration of the first snapshot, a first subset of the first set of physical storage locations as storing a first portion of the first data that is superseded by second data associated with a second snapshot of the computing system, the second data stored to a second set of physical storage locations within the storage system as part of a second backup procedure for the computing system subsequent to the first backup procedure, deleting, after identifying the first subset of the first set of physical storage locations, the first portion of the first data from the first subset of the first set of physical storage locations, and retaining, after the expiration of the first snapshot, a second portion of the first data at a second subset of the first set of physical storage locations.

An apparatus for data management is described. The apparatus may include at least one processor, memory coupled with the at least one processor, and instructions stored in the memory. The instructions may be executable by the at least one processor to cause the apparatus to identify an expiration of a first snapshot of a computing system, where the first snapshot indicates a first set of physical storage locations within a storage system to which first data of the computing system was stored as part of a first backup procedure for the computing system, identify, based on the expiration of the first snapshot, a first subset of the first set of physical storage locations as storing a first portion of the first data that is superseded by second data associated with a second snapshot of the computing system, the second data stored to a second set of physical storage locations within the storage system as part of a second backup procedure for the computing system subsequent to the first backup procedure, delete, after identifying the first subset of the first set of physical storage locations, the first portion of the first data from the first subset of the first set of physical storage locations, and retain, after the expiration of the first snapshot, a second portion of the first data at a second subset of the first set of physical storage locations.

Another apparatus for data management is described. The apparatus may include means for identifying an expiration of a first snapshot of a computing system, where the first snapshot indicates a first set of physical storage locations within a storage system to which first data of the computing system was stored as part of a first backup procedure for the computing system, means for identifying, based on the expiration of the first snapshot, a first subset of the first set of physical storage locations as storing a first portion of the first data that is superseded by second data associated with a second snapshot of the computing system, the second data stored to a second set of physical storage locations within the storage system as part of a second backup procedure for the computing system subsequent to the first backup procedure, means for deleting, after identifying the first subset of the first set of physical storage locations, the first portion of the first data from the first subset of the first set of physical storage locations, and means for retaining, after the expiration of the first snapshot, a second portion of the first data at a second subset of the first set of physical storage locations.

A non-transitory computer-readable medium storing code for data management is described. The code may include instructions executable by at least one processor to identify an expiration of a first snapshot of a computing system, where the first snapshot indicates a first set of physical storage locations within a storage system to which first data of the computing system was stored as part of a first backup procedure for the computing system, identify, based on the expiration of the first snapshot, a first subset of the first set of physical storage locations as storing a first portion of the first data that is superseded by second data associated with a second snapshot of the computing system, the second data stored to a second set of physical storage locations within the storage system as part of a second backup procedure for the computing system subsequent to the first backup procedure, delete, after identifying the first subset of the first set of physical storage locations, the first portion of the first data from the first subset of the first set of physical storage locations, and retain, after the expiration of the first snapshot, a second portion of the first data at a second subset of the first set of physical storage locations.

Some examples of the method, apparatuses, and non-transitory computer-readable medium described herein may further include operations, features, means, or instructions for identifying that a quantity of snapshots included in a set of expired snapshots satisfies a threshold quantity, the set of expired snapshots including the first snapshot and creating, based on the quantity of snapshots satisfying the threshold quantity, a third snapshot including the second data associated with the second snapshot and non-superseded data stored at respective subsets of physical storage locations indicated by the set of expired snapshots.

Some examples of the method, apparatuses, and non-transitory computer-readable medium described herein may further include operations, features, means, or instructions for identifying that a quantity of data retained at respective physical storage locations indicated by a set of expired snapshots and superseded by subsequently stored data satisfies a threshold, the set of expired snapshots including the first snapshot and creating, based on the quantity of data retained at the respective physical storage locations satisfying the threshold, a third snapshot including the second data associated with the second snapshot and retained data stored at the respective physical storage locations that may be not superseded by the subsequent data.

Some examples of the method, apparatuses, and non-transitory computer-readable medium described herein may further include operations, features, means, or instructions for identifying, for each physical storage location within the first subset, that an entirety of the physical storage location stores a respective portion of the first data that may be superseded by the second data, where the first portion of the first data may be deleted from the first subset based on an entirety of each physical storage location within first subset storing superseded data.

In some examples of the method, apparatuses, and non-transitory computer-readable medium described herein, a first portion of a physical storage location of the second subset stores a third portion of the first data that may be superseded by the second data and a second portion of the physical storage location stores a fourth portion of the first data that may be not superseded by the second data and after the first portion of the first data may be deleted, the third portion of the first data and the fourth portion of the first data may be retained at the physical storage location based on the fourth portion of the first data not being superseded by the second data.

In some examples of the method, apparatuses, and non-transitory computer-readable medium described herein, at least a portion of each physical storage location within the second subset stores a respective portion of the first data that may be not superseded by the second data and the second portion of the first data may be retained at the second subset based on each physical storage location within the second subset storing non-superseded data.

Some examples of the method, apparatuses, and non-transitory computer-readable medium described herein may further include operations, features, means, or instructions for reading metadata associated with the first snapshot and the second snapshot to identify a set of physical storage locations from the first set and the second set that store non-superseded data of the computing system, where the first subset of the first set of physical storage locations may be excluded from the identified set of physical storage locations, and where the first subset of the first set of physical storage locations may be identified as storing the first portion of the first data that may be superseded by the second data based on being excluded from the identified set of physical storage locations.

In some examples of the method, apparatuses, and non-transitory computer-readable medium described herein, the metadata indicates physical addresses at which the non-superseded data may be stored and the method, apparatuses, and non-transitory computer-readable medium may include further operations, features, means, or instructions for mapping the indicated physical addresses to the set of physical storage locations based on the physical storage locations of the set of physical storage locations corresponding to address ranges that include the physical addresses, where the set of physical storage locations may be identified based on the mapping.

Some examples of the method, apparatuses, and non-transitory computer-readable medium described herein may further include operations, features, means, or instructions for updating a bitmap to indicate that the first subset of the first set of physical storage locations store superseded data based on the first subset of the first set of physical storage locations being excluded from the identified set of physical storage locations, where bits of the bitmap correspond to respective physical storage locations within the first set.

In some examples of the method, apparatuses, and non-transitory computer-readable medium described herein, the metadata includes index information associated with the first snapshot, the second snapshot, an additional snapshot, or any combination thereof, the index information indicating respective physical addresses at which the first data, the second data, additional data associated with the additional snapshot, or any combination thereof, may be stored.

Some examples of the method, apparatuses, and non-transitory computer-readable medium described herein may further include operations, features, means, or instructions for reading data of the second portion of the first data from a physical storage location of the second subset after deleting the first portion of the first data and based on retaining the second portion of the first data at the second subset.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   deleting, by a data management system (DMS) and based at least in part on an expiration of a first snapshot of a set of expired snapshots of a computing system, a first portion of first data associated with the first snapshot from a first subset of a first set of physical storage locations within a storage system, the first portion of the first data corresponding to a first physical data block that spans a first range of physical addresses;
   retaining, by the DMS after the expiration of the first snapshot, a second portion of the first data associated with the first snapshot at a second subset of the first set of physical storage locations, the second portion of the first data corresponding to a second physical data block that spans a second range of physical addresses, wherein:
      the first snapshot indicates the first set of physical storage locations to which the first data of the computing system was stored as part of a first backup procedure for the computing system,
      an entirety of the first portion of the first data associated with the first snapshot is superseded by second data associated with a second snapshot of the computing system, the second data stored to a second set of physical storage locations within the storage system as part of a second backup procedure for the computing system subsequent to the first backup procedure,
      the first portion of the first data associated with the first snapshot is deleted based at least in part on the entirety of the first portion of the first data being superseded by the second data associated with the second snapshot of the computing system, and
      the second portion of the first data associated with the first snapshot is retained based at least in part on the second range of physical addresses comprising a first subset of data that is not superseded by the second data, wherein a second subset of data included in the second range of physical addresses is superseded by the second data, and wherein the second subset of the second portion of data is retained despite being superseded by the second data based at least in part on the second range of physical addresses also including the first subset of data that is not superseded by the second data; and
   creating a third snapshot comprising the second data associated with the second snapshot and non-superseded data stored at respective subsets of physical storage locations indicated by the set of expired snapshots, the non-superseded data comprising the first subset of data.

2. The method of claim 1, further comprising:
   identifying that a quantity of snapshots included in the set of expired snapshots satisfies a threshold quantity, the set of expired snapshots comprising the first snapshot; and
   creating, based at least in part on the quantity of snapshots satisfying the threshold quantity, the third snapshot.

3. The method of claim 1, further comprising:
   identifying that a quantity of data retained at respective physical storage locations indicated by the set of expired snapshots and superseded by subsequently stored data satisfies a threshold, the set of expired snapshots comprising the first snapshot; and
   creating, based at least in part on the quantity of data retained at the respective physical storage locations satisfying the threshold, the third snapshot.

4. The method of claim 1, wherein:
   a first portion of a physical storage location of the second subset of the first set of physical storage locations stores a third portion of the first data that is superseded by the second data and a second portion of the physical storage location stores a fourth portion of the first data that is not superseded by the second data, and
   after the first portion of the first data is deleted, the third portion of the first data and the fourth portion of the first data are retained at the physical storage location based at least in part on the fourth portion of the first data not being superseded by the second data.

5. The method of claim 1, wherein:
   at least a portion of each physical storage location within the second subset of the first set of physical storage locations stores a respective portion of the first data that is not superseded by the second data, and
   the second portion of the first data is retained at the second subset of the first set of physical storage locations based at least in part on each physical storage location within the second subset of the first set of physical storage locations storing non-superseded data.

6. The method of claim 1, further comprising:
   reading metadata associated with the first snapshot and the second snapshot to identify a set of physical storage locations from the first set and the second set that store non-superseded data of the computing system,
   wherein the first subset of the first set of physical storage locations are excluded from the identified set of physical storage locations, and
   wherein the first subset of the first set of physical storage locations are identified as storing the first portion of the first data that is superseded by the second data based at least in part on being excluded from the identified set of physical storage locations.

7. The method of claim 6, wherein the metadata indicates physical addresses at which the non-superseded data is stored, the method further comprising:
   mapping the indicated physical addresses to the set of physical storage locations based at least in part on the physical storage locations of the set of physical storage locations corresponding to address ranges that include the physical addresses, wherein the set of physical storage locations is identified based at least in part on the mapping.

8. The method of claim 6, further comprising:
   updating a bitmap to indicate that the first subset of the first set of physical storage locations store superseded data based at least in part on the first subset of the first set of physical storage locations being excluded from the identified set of physical storage locations, wherein bits of the bitmap correspond to respective physical storage locations within the first set of physical storage locations.

9. The method of claim 6, wherein the metadata comprises index information associated with the first snapshot, the second snapshot, an additional snapshot, or any combination thereof, the index information indicating respective physical addresses at which the first data, the second data, additional data associated with the additional snapshot, or any combination thereof, are stored.

10. The method of claim 1, further comprising:
reading data of the second portion of the first data from a physical storage location of the second subset of the first set of physical storage locations after deleting the first portion of the first data and based at least in part on retaining the second portion of the first data at the second subset of the first set of physical storage locations.

11. The method of claim 1, wherein:
the first set of physical locations comprises a plurality of groups of physical storage locations;
the first portion of the first data is stored in a first subset of groups of physical storage locations of the plurality of groups of physical storage locations, wherein a respective part of the first data stored in each physical storage location in each of the first subset of groups of physical storage locations is superseded by the second data; and
the second portion of the first data is stored in a second subset of groups of physical storage locations of the plurality of groups of physical storage locations, wherein at least one physical storage location in each group within the second subset of groups of physical storage locations stores a respective part of the first data that is not superseded by the second data, and wherein the second subset of data included in the second portion of the first data is retained based at least in part on at least one physical storage location in each group within the second subset of groups of physical storage locations storing the respective part of the first data that is not superseded.

12. An apparatus, comprising:
at least one processor of a data management system (DMS);
memory of the DMS, the memory coupled with the at least one processor; and
instructions stored in the memory and executable by the at least one processor to cause the apparatus to:
delete, by the DMS and based at least in part on an expiration of a first snapshot of a set of expired snapshots of a computing system, a first portion of first data associated with the first snapshot from a first subset of a first set of physical storage locations within a storage system, the first portion of the first data corresponding to a first physical data block that spans a first range of physical addresses;
retain, by the DMS after the expiration of the first snapshot, a second portion of the first data associated with the first snapshot at a second subset of the first set of physical storage locations, the second portion of the first data corresponding to a second physical data block that spans a second range of physical addresses, wherein:
the first snapshot indicates the first set of physical storage locations to which the first data of the computing system was stored as part of a first backup procedure for the computing system,
an entirety of the first portion of the first data associated with the first snapshot is superseded by second data associated with a second snapshot of the computing system, the second data stored to a second set of physical storage locations within the storage system as part of a second backup procedure for the computing system subsequent to the first backup procedure,
the instructions are executable by the at least one processor to cause the apparatus to delete the first portion of the first data associated with the first snapshot based at least in part on the entirety of the first portion of the first data being superseded by the second data associated with the second snapshot of the computing system, and
the instructions are executable by the at least one processor to cause the apparatus to retain the second range of physical addresses based at least in part on the second portion of the first data associated with the first snapshot comprising a first subset of data that is not superseded by the second data, wherein a second subset of data included in the second range of physical addresses is superseded by the second data, and wherein the second subset of the second portion of data is retained despite being superseded by the second data based at least in part on the second range of physical addresses also including the first subset of data that is not superseded by the second data; and
creating a third snapshot comprising the second data associated with the second snapshot and non-superseded data stored at respective subsets of physical storage locations indicated by the set of expired snapshots, the non-superseded data comprising the first subset of data.

13. The apparatus of claim 12, wherein the instructions are further executable by the at least one processor to cause the apparatus to:
identify that a quantity of snapshots included in the set of expired snapshots satisfies a threshold quantity, the set of expired snapshots comprising the first snapshot; and
create, based at least in part on the quantity of snapshots satisfying the threshold quantity, the third snapshot.

14. The apparatus of claim 12, wherein the instructions are further executable by the at least one processor to cause the apparatus to:
identify that a quantity of data retained at respective physical storage locations indicated by the set of expired snapshots and superseded by subsequently stored data satisfies a threshold, the set of expired snapshots comprising the first snapshot; and
create, based at least in part on the quantity of data retained at the respective physical storage locations satisfying the threshold, the third snapshot.

15. The apparatus of claim 12, wherein:
a first portion of a physical storage location of the second subset of the first set of physical storage locations stores a third portion of the first data that is superseded by the second data and a second portion of the physical storage location stores a fourth portion of the first data that is not superseded by the second data, and
after the first portion of the first data is deleted, the third portion of the first data and the fourth portion of the first data are retained at the physical storage location based at least in part on the fourth portion of the first data not being superseded by the second data.

16. The apparatus of claim 12, wherein:
at least a portion of each physical storage location within the second subset of the first set of physical storage locations stores a respective portion of the first data that is not superseded by the second data, and
the second portion of the first data is retained at the second subset of the first set of physical storage locations based at least in part on each physical storage location within the second subset of the first set of physical storage locations storing non-superseded data.

17. The apparatus of claim 12, wherein the instructions are further executable by the at least one processor to cause the apparatus to:
read metadata associated with the first snapshot and the second snapshot to identify a set of physical storage locations from the first set and the second set that store non-superseded data of the computing system,
wherein the first subset of the first set of physical storage locations are excluded from the identified set of physical storage locations, and
wherein the first subset of the first set of physical storage locations are identified as storing the first portion of the first data that is superseded by the second data based at least in part on being excluded from the identified set of physical storage locations.

18. A non-transitory computer-readable medium storing code, the code comprising instructions executable by at least one processor to:
delete, by a data management system (DMS) and based at least in part on an expiration of a first snapshot of a set of expired snapshots of a computing system, a first portion of first data associated with the first snapshot from a first subset of a first set of physical storage locations within a storage system, the first portion of the first data corresponding to a first physical data block that spans a first range of physical addresses;
retain, by the DMS after the expiration of the first snapshot, a second portion of the first data associated with the first snapshot at a second subset of the first set of physical storage locations, the second portion of the first data corresponding to a second physical data block that spans a second range of physical addresses, wherein:
the first snapshot indicates the first set of physical storage locations to which the first data of the computing system was stored as part of a first backup procedure for the computing system,
an entirety of the first portion of the first data associated with the first snapshot is superseded by second data associated with a second snapshot of the computing system, the second data stored to a second set of physical storage locations within the storage system as part of a second backup procedure for the computing system subsequent to the first backup procedure,
the instructions are executable by the at least one processor to delete the first portion of the first data associated with the first snapshot based at least in part on the entirety of the first portion of the first data being superseded by the second data associated with the second snapshot of the computing system, and
the instructions are executable by the at least one processor to retain the second portion of the first data associated with the first snapshot based at least in part on the second range of physical addresses comprising a first subset of data that is not superseded by the second data, wherein a second subset of data included in the second range of physical addresses is superseded by the second data, and wherein the second subset of the second portion of data is retained despite being superseded by the second data based at least in part on the second range of physical addresses also including the first subset of data that is not superseded by the second data; and
creating a third snapshot comprising the second data associated with the second snapshot and non-superseded data stored at respective subsets of physical storage locations indicated by the set of expired snapshots, the non-superseded data comprising the first subset of data.

19. The non-transitory computer-readable medium of claim 18, the code further comprising instructions executable by the at least one processor to:
identify that a quantity of snapshots included in a set of expired snapshots satisfies a threshold quantity, the set of expired snapshots comprising the first snapshot; and
create, based at least in part on the quantity of snapshots satisfying the threshold quantity, the third snapshot.

20. The non-transitory computer-readable medium of claim 18, the code further comprising instructions executable by the at least one processor to:
identify that a quantity of data retained at respective physical storage locations indicated by a set of expired snapshots and superseded by subsequently stored data satisfies a threshold, the set of expired snapshots comprising the first snapshot; and
create, based at least in part on the quantity of data retained at the respective physical storage locations satisfying the threshold, the third snapshot.

* * * * *